Oct. 6, 1959 G. H. TABER 2,907,578
MEANS FOR EFFECTING THE AUTOMATIC ADJUSTMENT
OF WHEEL CAMBER IN AUTOMOTIVE VEHICLES
Filed May 26, 1954 9 Sheets-Sheet 1

Inventor
George H. Taber
By Shoemaker & Mattare
ATTYS.

Oct. 6, 1959 — G. H. TABER — 2,907,578
MEANS FOR EFFECTING THE AUTOMATIC ADJUSTMENT OF WHEEL CAMBER IN AUTOMOTIVE VEHICLES
Filed May 26, 1954 — 9 Sheets-Sheet 2

Inventor
George H. Taber
By Shoemaker & Mattare
ATTYS

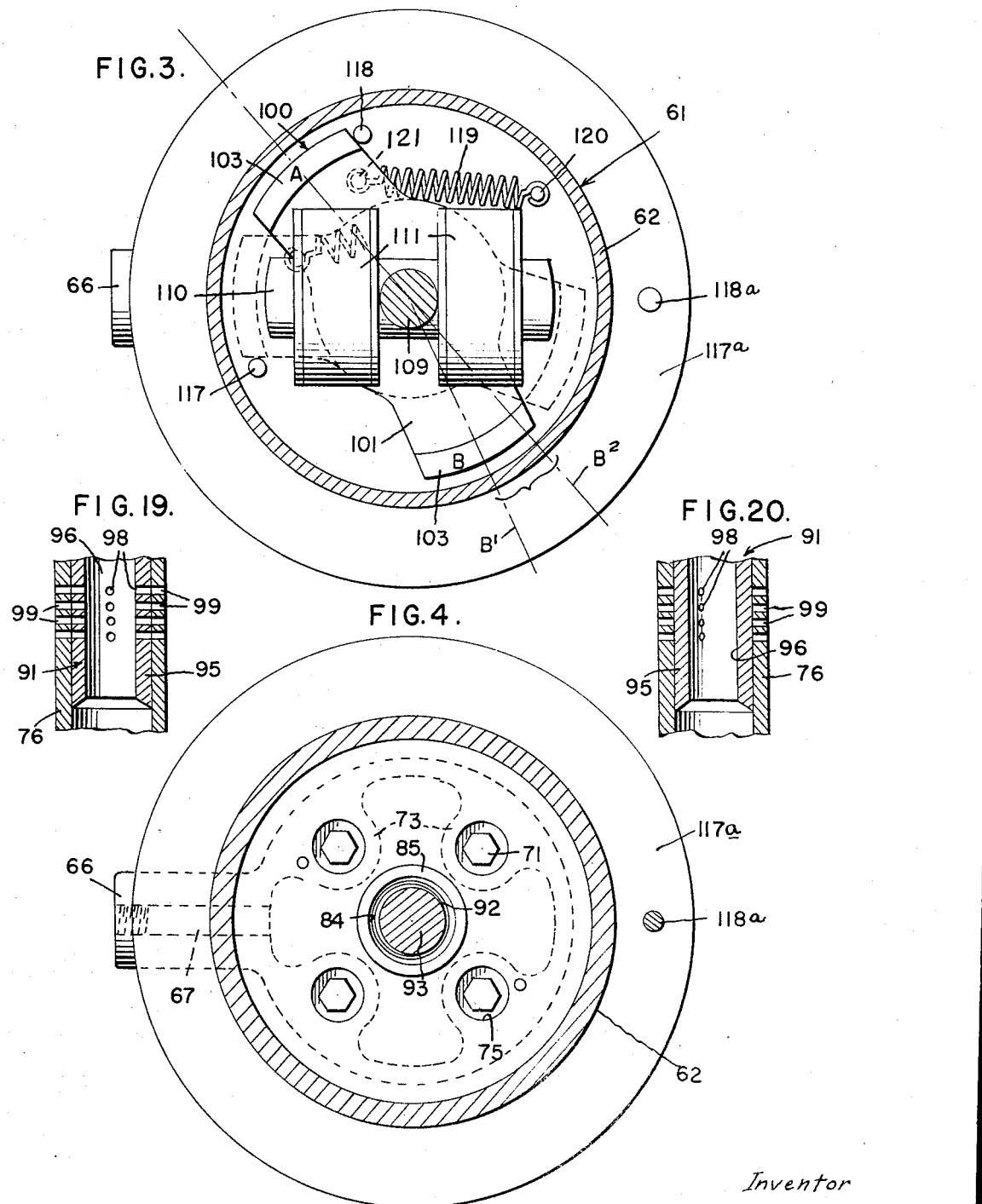

Oct. 6, 1959 G. H. TABER 2,907,578
MEANS FOR EFFECTING THE AUTOMATIC ADJUSTMENT
OF WHEEL CAMBER IN AUTOMOTIVE VEHICLES
Filed May 26, 1954 9 Sheets-Sheet 4
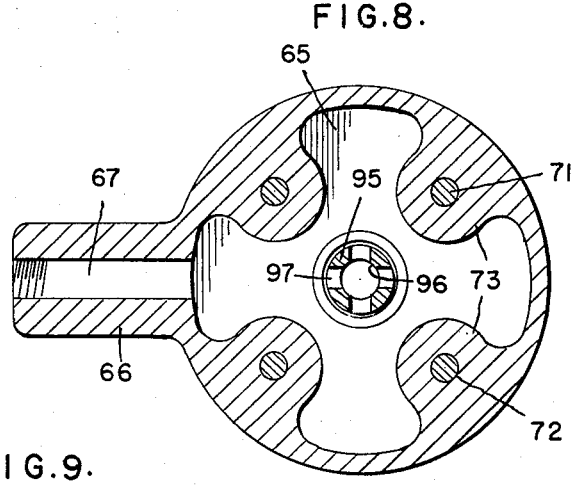
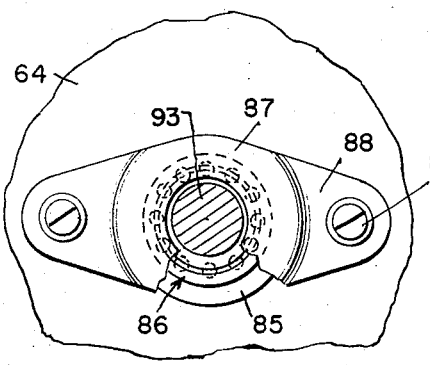
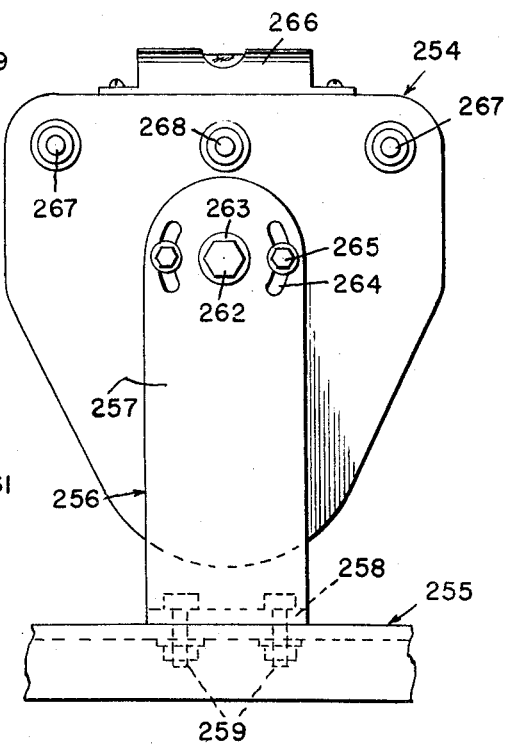
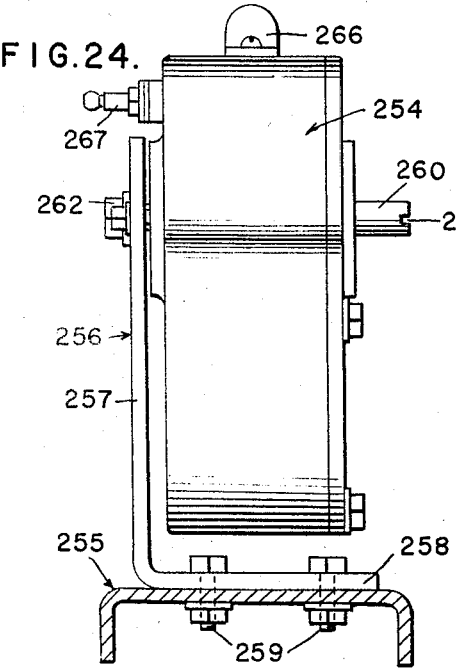
Inventor
George H. Taber
By Shoemaker & Mattare
ATTYS.

Oct. 6, 1959

G. H. TABER 2,907,578

MEANS FOR EFFECTING THE AUTOMATIC ADJUSTMENT
OF WHEEL CAMBER IN AUTOMOTIVE VEHICLES

Filed May 26, 1954

Inventor
George H. Taber

By Shoemaker & Mattare
ATTYS.

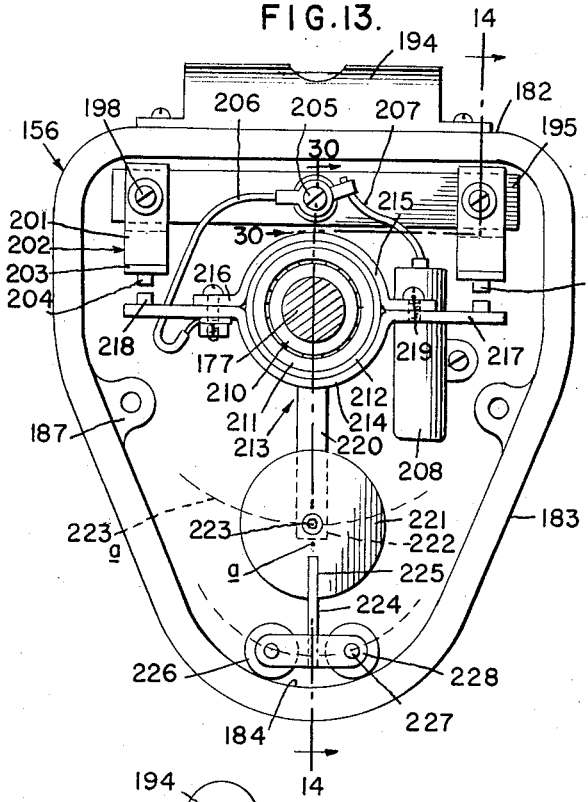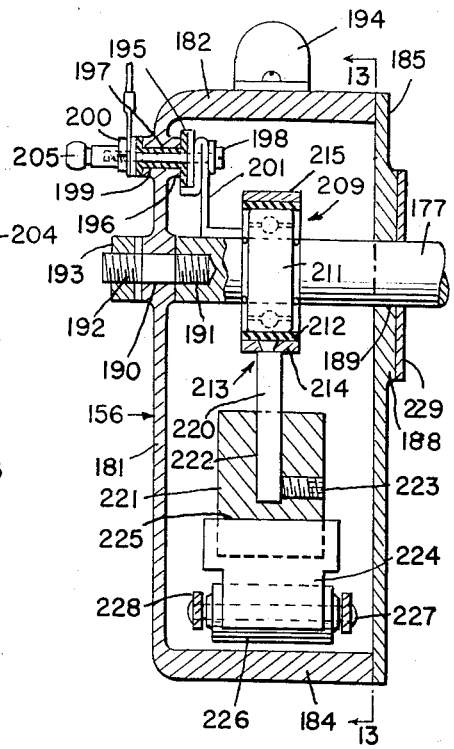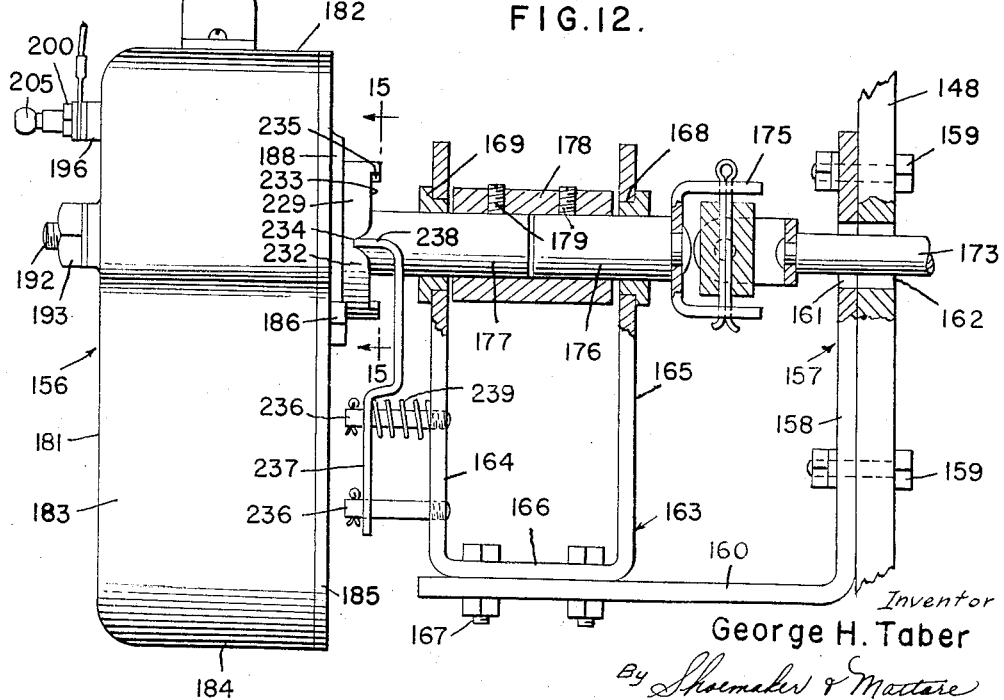

Oct. 6, 1959 G. H. TABER 2,907,578
MEANS FOR EFFECTING THE AUTOMATIC ADJUSTMENT
OF WHEEL CAMBER IN AUTOMOTIVE VEHICLES
Filed May 26, 1954 9 Sheets-Sheet 7
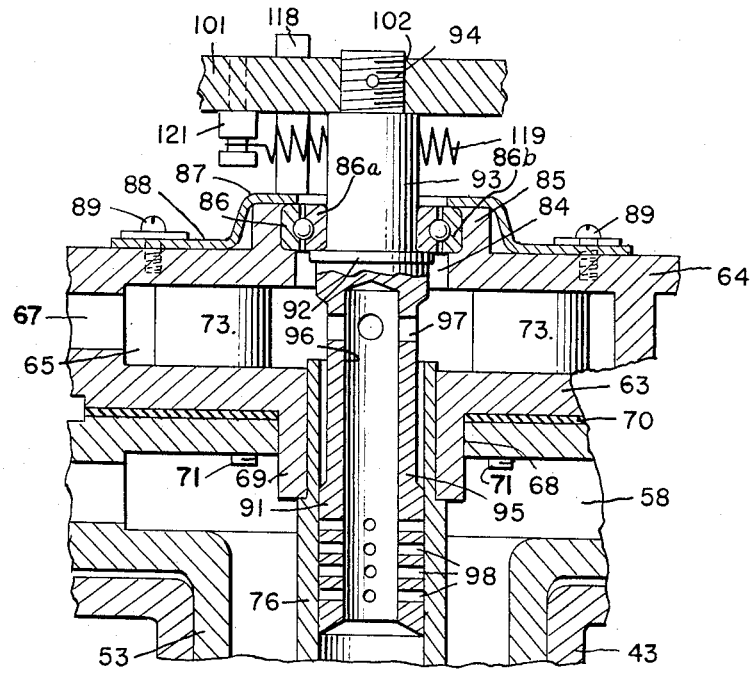
FIG. 28.
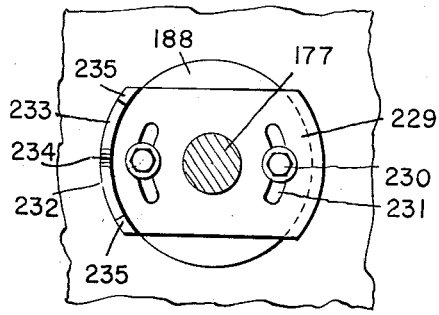
FIG. 15.
FIG. 27.
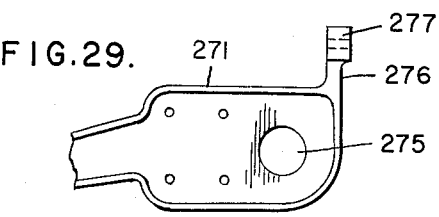
FIG. 30
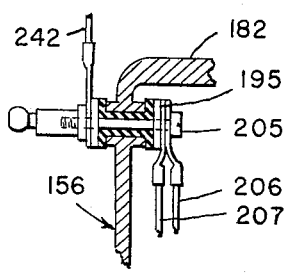
FIG. 29.
Inventor
George H. Taber
By Shoemaker & Mattare
ATTYS Inventor
George H. Taber
By Shoemaker & Mattare
ATTYS.

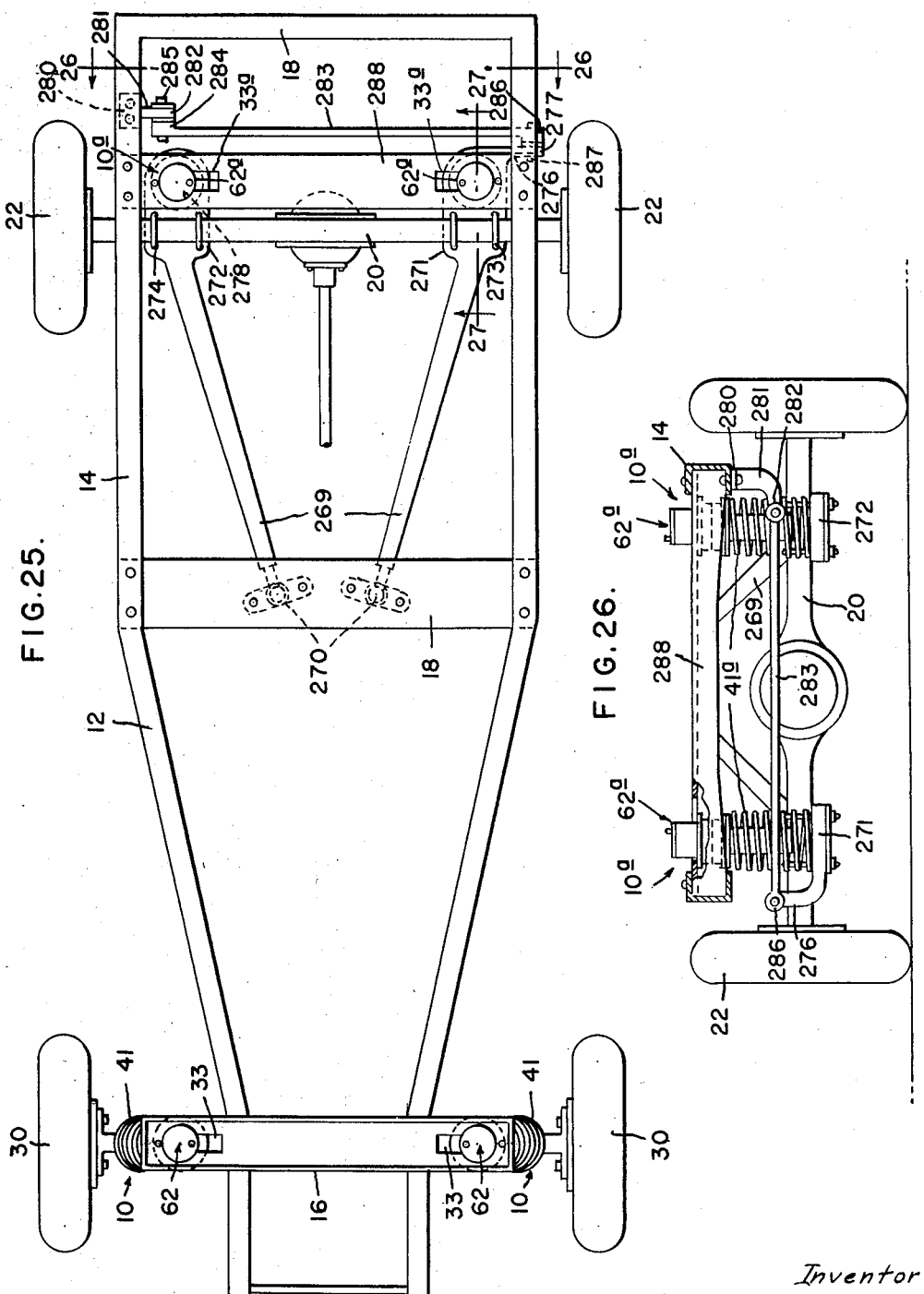

United States Patent Office 2,907,578
Patented Oct. 6, 1959

2,907,578

MEANS FOR EFFECTING THE AUTOMATIC ADJUSTMENT OF WHEEL CAMBER IN AUTOMOTIVE VEHICLES

George H. Taber, Elmira, N.Y.

Application May 26, 1954, Serial No. 432,356

19 Claims. (Cl. 280—112)

This invention relates generally to the pleasure car class of automotive vehicles and is directed particularly to mechanism for use in association with such vehicles for improving steering control assistance thereof.

Broadly the present invention provides a new and novel mechanism for effecting the automatic adjustment of wheel camber relationship to steering conditions in the operation of automotive vehicles.

In the operation or running of modern motor vehicles employing independent spring suspension structure for steerable running gear wheels, control of the steering is materially affected when the vehicle is traveling along a curved path, particularly when the vehicle is rounding a curve at a relatively high speed due to momentary changes in wheel camber whereby undue effort is required of the driver to overcome, or overpower, the tractive steering pull which such changes produce. It is accordingly an object of the present invention to provide a new and novel mechanism for establishing a corrective position of wheel camber when steering the vehicle in a circular path so as to maintain maximum assistance to steering by a properly inclined camber relation to the radius point of steering turn.

In steering a fast moving vehicle along a circular path inertia forces tend, as is well known, to raise the side of the vehicle body on the inside of the curve, which raising movement increases with speed and sharpness of the curve and such movement or action not only has an adverse effect upon steering control but creates a condition which requires excessive manual effort on the part of the operator. Accordingly, a further object is to provide mechanism for counteracting this inertia effect through the provision of means for lowering the side of the vehicle on the inside of the curve whereby steering effort is reduced to a minimum.

It is known that different systems have been heretofore devised for counteracting the tendency of a vehicle body to rise on one side when rounding a curve but such systems were not designed with a view to changing, or affecting momentarily, the steering wheel camber for the purpose of easing the steering and increasing tire tread mileage, as is one object of the present invention and such other systems depend upon means for lifting the vehicle body on the outside of the curve, at a moment that is contrary to correction, to compensate for the rise on the inside and this lifting action requires the employment of a considerable amount of power or high pressure in fluid lines and cylinders and, in addition, does not always result in compensating for or counteracting the rising action of the vehicle body on the inside of the curve due to centrifugal force. Another object of the present invention is, accordingly, to provide a new and novel apparatus of the character described which is so designed that gravitational forces are utilized to bring about a desired movement of one side of the vehicle relative to the other side under certain operating conditions of the moving vehicle and under other conditions of unbalance resulting from unequalized load forces thereon.

A further object of the invention is to provide, in a manner as hereinafter set forth, mechanism for effecting automatic adjustment of wheel camber to steering conditions in a motor vehicle, wherein a fluid pressure means is provided for maintaining the vehicle body at a predetermined elevation about that normally afforded by the vehicle supporting springs with means functioning upon the assuming by the body of an unlevel condition to relieve the pressure of such means on the proper side of the vehicle body to cause the body to be restored by gravitational action to a desired transversely level state.

Another object of the invention is to provide a mechanism of the above described character wherein said fluid pressure means is maintained by and during the operation of the automotive vehicle engine.

Another object is to provide in a mechanism of the character stated a gravity or inertia actuated pendulum controlling an electric current distributor unit of a new and novel character by means of which electric control circuits are energized or de-energized in accordance with the movements of the vehicle body relative to the transversely horizontal for the actuation of means for counteracting such movements so that the vehicle body will be maintained in a desired transverse level state regardless of centrifugal forces to which the body may be subjected; unevenness or inclination of road surface over which the vehicle is traveling, or an uneven distribution of load in the vehicle body.

Another object of the invention is to provide means in a mechanism of the character stated whereby manual control may be exercised over the automatic pendulum controlled means for effecting operation of the said movement counteracting means either for the purpose of bringing about the desired transverse inclination of the vehicle body in advance of the movement thereof from a level condition by the action of centrifugal or other forces, or for the purpose of raising one side of the body while lowering the opposite side to facilitate tire changing or other work.

Still another object of the invention is to provide a new and novel electrically controlled or actuated valve means for regulating the flow of fluid under pressure to and from pressurized hydraulic elevating units whereby the release of fluid from certain of the units may be effected to permit such units to lower a side of the vehicle body as required to maintain the body in a transversely level condition.

The present invention is distinguished by the provision of a system through which pressurized hydraulic liquid can be kept in a state of circulation after right and left sides of the automotive vehicle body have been elevated to a predetermined height above the normal body elevation on the four suspension springs for the vehicle and thus, through the provision of hydraulic release valves located within hydraulic cylinders comprised in the means for maintaining the elevated condition of the two sides of the vehicle, either side of the vehicle body can be lowered through gravitational attraction and, by the provision of a twin type hydraulic pump with which two hydraulic elevating units on either side of the vehicle body have piped connection, the elevating units on one side of the vehicle body are independent of those upon the other side so far as the pressurized hydraulic liquid is concerned.

The present invention, therefore, due to recent engineering achievements in locating the independent suspension springs nearer to the plane of the vehicle body's center of gravity, provides greater opportunity to automatically or manually effect better wheel camber axis relation to the degree of circular travel or to maintain a state of wheel camber relation for a straight steering direction by causing the vehicle body to be in a more nearly level state transversely.

To establish the aforesaid desirable wheel camber conditions, the present invention, employing the automotive propelling energy in combination with electrically controlled, hydraulically actuated vehicle body elevating units, is associated with or utilizes gravitational attraction as a forceful medium to effect the quick lowering of two of the pre-elevated four vehicle body elevating units on either side of the automotive vehicle.

Other objects of the invention will become apparent from the following detailed description, one of which additional objects is to utilize the signal light control lever in vehicles equipped with directional signal running lights, as a means of diverting electric current from a gravity-inertia controlled electric current distributor to electrically actuated valve means forming a part of the hydraulically actuated elevating means at the moment the directional signal light switch is effective whereby to coincidentally cause the lowering of the right-hand or left-hand side of the vehicle body to establish in the running gear steering wheels a state of camber desirable for the intended direction of manual steering.

Another object is to provide a new and novel electrically controlled hydraulic elevating unit for a vehicle body and vehicle body coil spring supporting means wherein the hydraulic cylinder is supported on and surrounded by such coil spring, and said spring is supported on a seat carried by the vehicle running gear and having an opening through which the lower end of said cylinder may move downwardly upon compression of the spring.

A still further object is to provide a compact assembled hydraulically actuated vehicle body elevating unit comprising a cylinder and cylindrical piston operating therein and carrying fluid inlet and outlet chambers and an airtight housing for an electrically actuated unit connected with and designed, when energized, to actuate a valve means by which pressurized fluid is caused to flow from said inlet chamber to the outlet chamber to permit movement of the piston into the cylinder.

Still another object of the invention is to provide a new and novel electric current distributing unit having a pendulum means for making and breaking control circuits, with a gravity and inertia controlled means for damping movements and preventing rebound, of the pendulum to prevent undesirable making and breaking of the circuits.

Still another object of the invention is the provision of a new and novel coil suspension spring seat supported by vehicle running gear designed to permit downward movement of a part of a hydraulically elevated unit mounted on the spring and interposed between the spring and a frame element of the vehicle body.

Still another object is to provide a new and novel rear spring unit suspension means with which the hydraulic elevating units of the present invention may be effectively incorporated for supporting the rear of the vehicle body.

A further object is to provide in association with the above stated novel coil spring suspension means, a novel transverse tie rod coupling between the vehicle body frame or chassis frame and the rear running gear by which flexibility of vertical movement between the chassis frame and the running gear is permitted while restricting relative transverse movement between the body frame and the running gear lying therebeneath.

The foregoing and other objects are attained by the provision of hydraulic elevating units which are interposed between the vehicle body and the body supporting springs with a fluid conduit system in which such units are connected with a fluid supply and a pumping unit connected with the engine of the vehicle for continuous operation when the engine is running and such elevating units are so constructed and arranged that the fluid pressure maintained in the system by the pump will cause the units, two of which hydraulic elevating units are on each side of the vehicle body, to elevate the vehicle body to a predetermined extent above the normal spring supported elevation. Thus the fluid raised portions of the elevating units support the vehicle body on pressured fluid interposed between the body and the body supporting springs. Each of the hydraulic elevating units includes an electrically actuated release valve means which when moved to a pressure releasing or reducing position will permit fluid to be released from the elevating unit whereby the raised portion of the unit which is connected with the vehicle body is lowered by gravity alone.

Also forming a part of the control system is a distributor unit for controlling the electrical energization of the electric valve actuators of the elevating units and such distributor unit is, in one embodiment, gravity actuated whereby upon being disturbed from a normal horizontal position corresponding to a transversely horizontal position for the vehicle body, the electric release valve actuators for two hydraulic elevating units upon one side of the vehicle or upon the other side will be energized to permit the lowering of the side of the vehicle which may have been elevated as a result of centrifugal action such as would result from the movement of the vehicle in a circular path or as a result of movement of the vehicle body from a level position by any other means, whereby the lowering of the high side of the vehicle body will restore the body to a normal level condition.

Means is also provided for actuating the distributor unit manually whereby a desired lowering of one side of the vehicle body may be effected as desired when the vehicle is in motion or when it is stationary.

The invention will be best understood from a consideration of the following detailed description taken in connection with the accompanying drawings forming a part of the specification with the understanding, however, that the invention is not confined to a strict conformity with the showing of the drawings but may be changed or modified within the scope of the appended claims.

In the drawings:

Fig. 1 is a view in front elevation of a front wheel and the steering mechanism associated therewith of an automotive vehicle showing the application of one of the hydraulic elevating units of the present invention between a front spring and an end of a transverse frame upon which the vehicle body, not shown, is supported, a portion of the frame structure being in section, the hydraulic unit being under pressure and in the position assumed in maintaining the vehicle body at an elevated level or balanced state above the normal spring supported level.

Fig. 3 is a horizontal section taken substantially on the line 3—3 of Fig. 2 and showing on an enlarged scale the valve actuating magnetic means with the armature in the valve closed position which it assumes when the actuating magnets are de-energized.

Fig. 4 is a horizontal section, on an enlarged scale, taken substantially on the line 4—4 of Fig. 2 omitting the hold down plate and bearing and showing the upstanding flange in top plan.

Fig. 8 is a horizontal section taken substantially on the line 8—8 of Fig. 2, on an enlarged scale.

Figure 2:
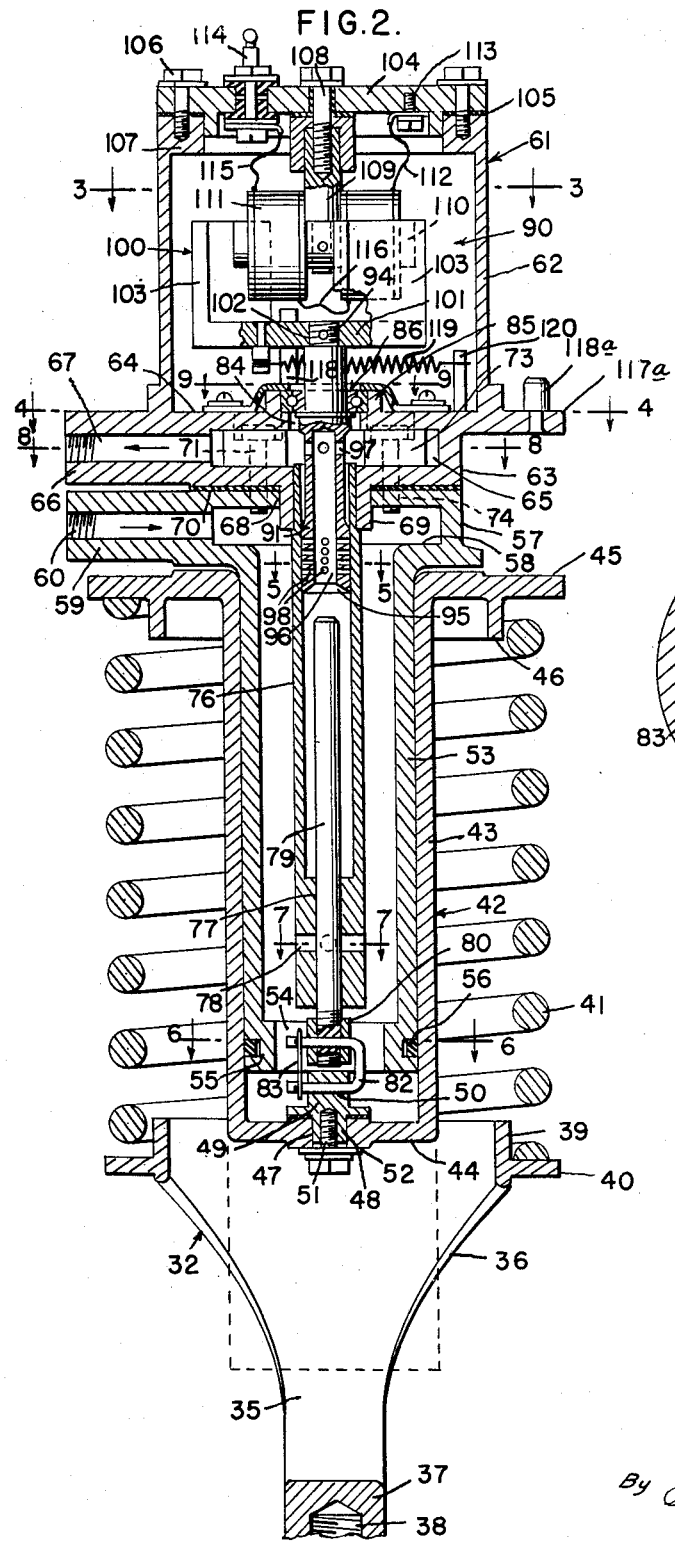
Fig. 2 is a longitudinal sectional view, on an enlarged scale, through one of the four hydraulic elevating units of the system.
Figure 10:
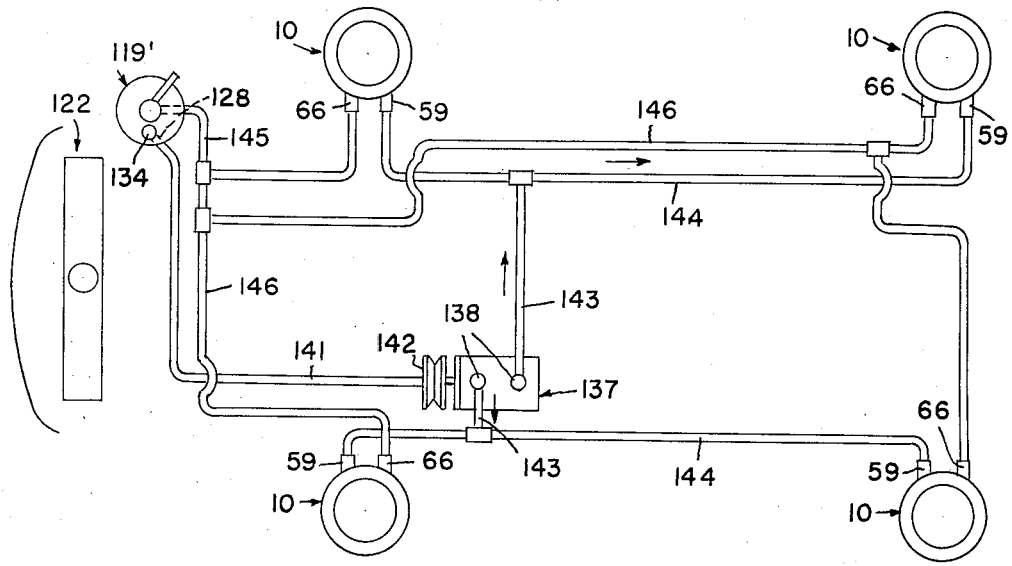

Fig. 9 is a detail section taken in a horizontal plane substantially on the line 9—9 of Fig. 2 and on an enlarged scale, Fig. 10 is a diagrammatic illustration of the layout of the fluid system including the hydraulic elevating units associated with the four wheels of the vehicle, the fluid circulating pump and fluid reservoir showing the preferred relation of the latter to the radiator structure of the vehicle.

Figure 11:
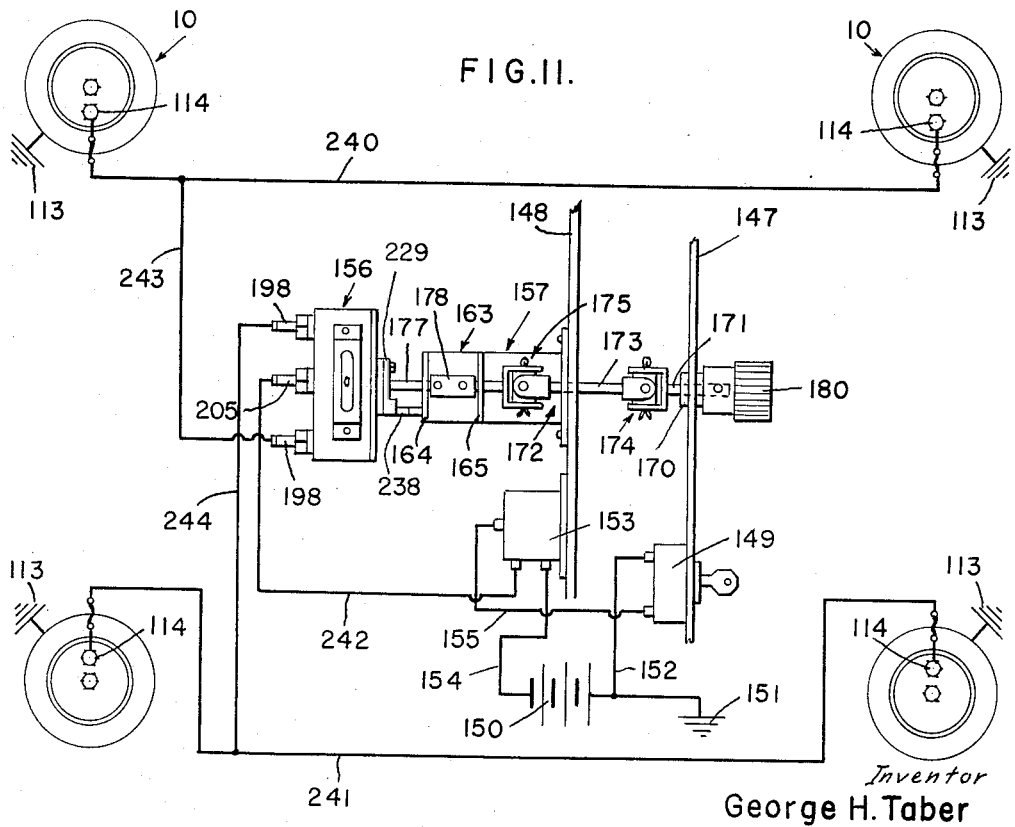

Fig. 11 is a diagrammatic layout of the electrical system associated with the invention and showing in top plan therein the distributor unit together with one means for manually controlling the latter.

Fig. 12 is a view in side elevation and upon an enlarged scale of the distributor unit mounting means and manual control therefor as shown in Fig. 11, the unit being in side elevation and portions of the manual control elements therefor being in section.

Fig. 13 is a view looking into the housing of the control unit shown in Figs. 11 and 12, from the plane of section line 13—13 on Fig. 14, the cover plate for the housing being removed and the supporting shaft being in transverse section.

Fig. 14 is a sectional view taken substantially on the line 14—14 of Fig. 13.

Fig. 15 is a detail section taken in the plane of section line 15—15 of Fig. 12 looking in the direction of the arrows.

Figure 1:
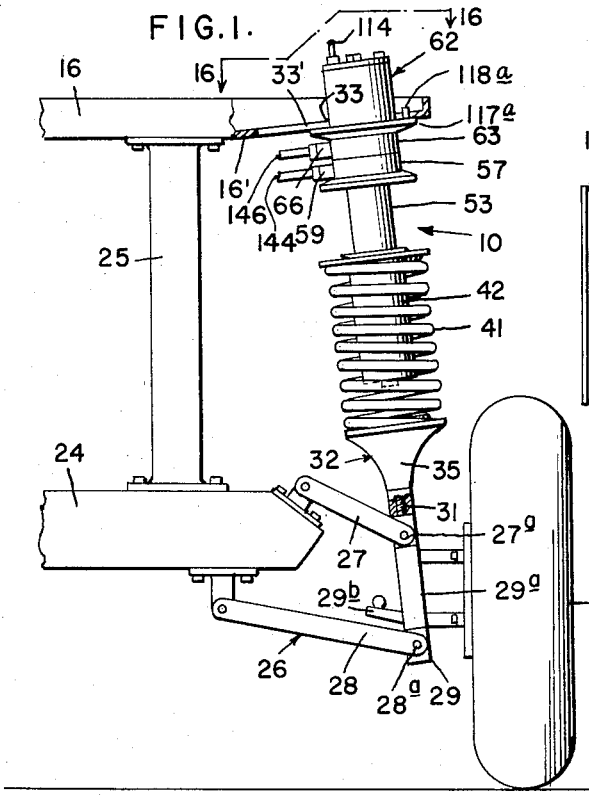
Figure 16:
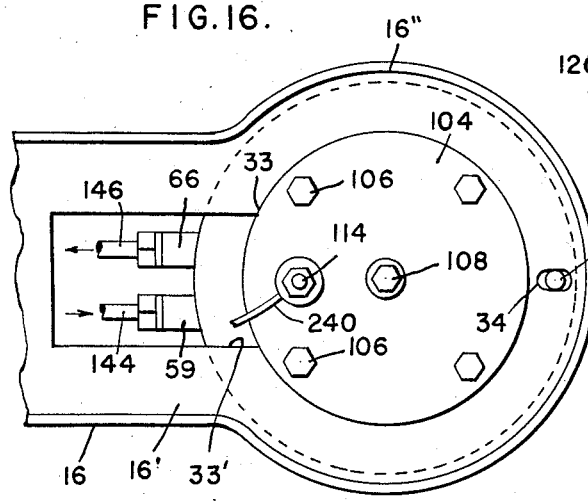

Fig. 16 is a view from the plane of line 16—16 in Fig. 1 showing in top plan a hydraulic elevating unit and the end of the cross frame against the underside of which the top end portion of the unit bears.

Figure 17:
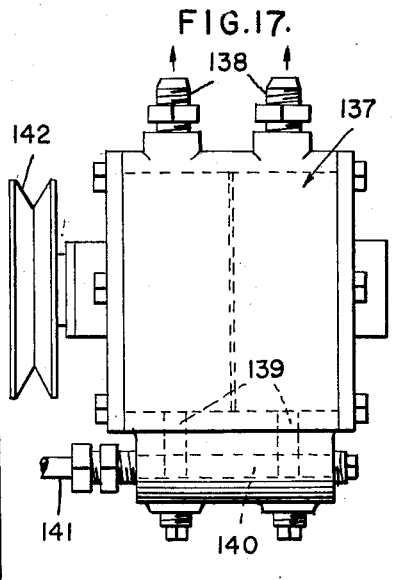

Fig. 17 is a view in side elevation of the dual pump for circulating the fluid to the hydraulic units.

Figure 18:
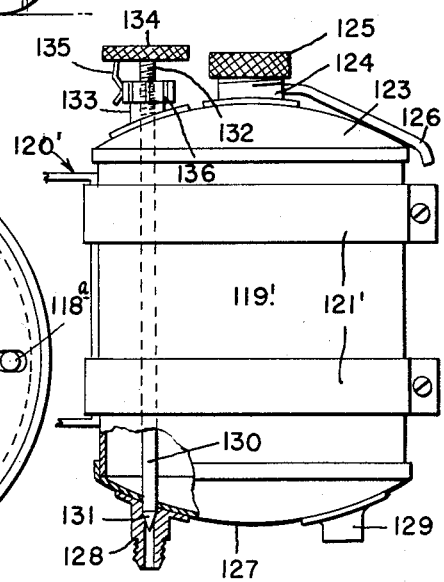

Fig. 18 is a view in side elevation, with portions broken away, of a preferred form of fluid reservoir.

Fig. 19 is a detail section taken longitudinally through a portion of the control valve of a hydraulic unit showing the open position of the valve and Fig. 20 is a view corresponding to Fig. 19 but showing the closed position of the valve.

Figure 21:
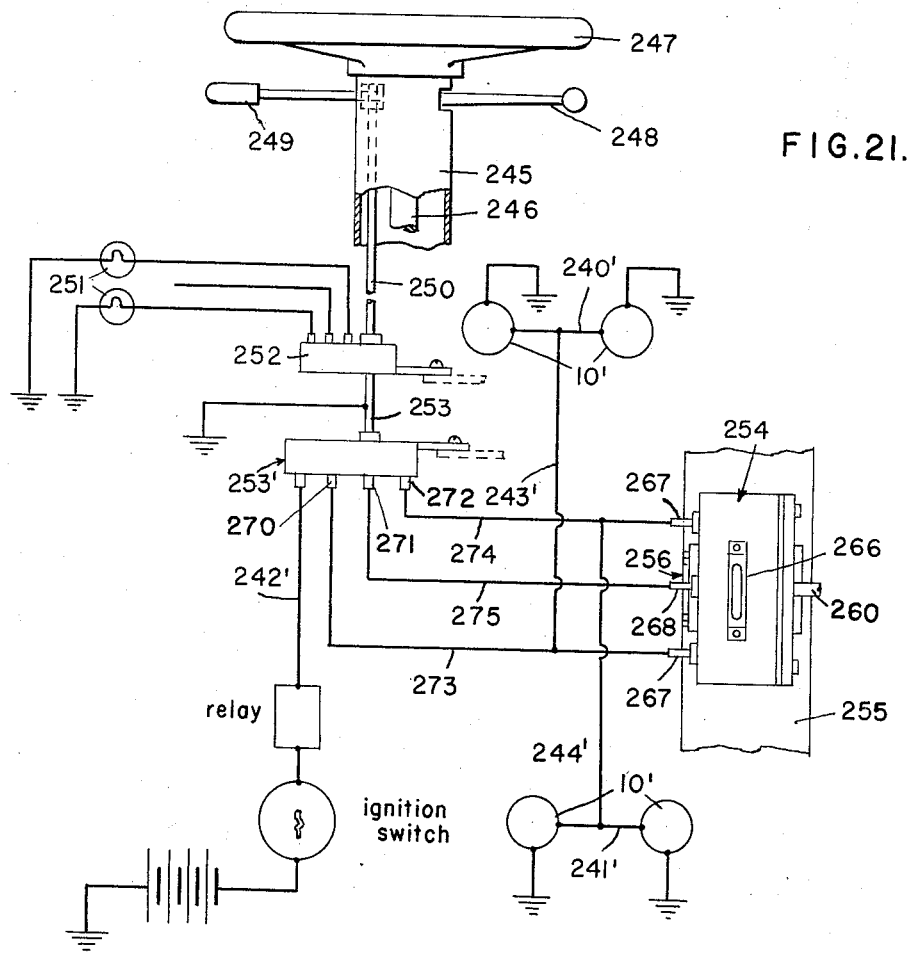

Fig. 21 is an electrical diagram showing another arrangement for manually controlling the distributor unit by tying in the unit with the vehicle turn signal indicator.

Figure 22:
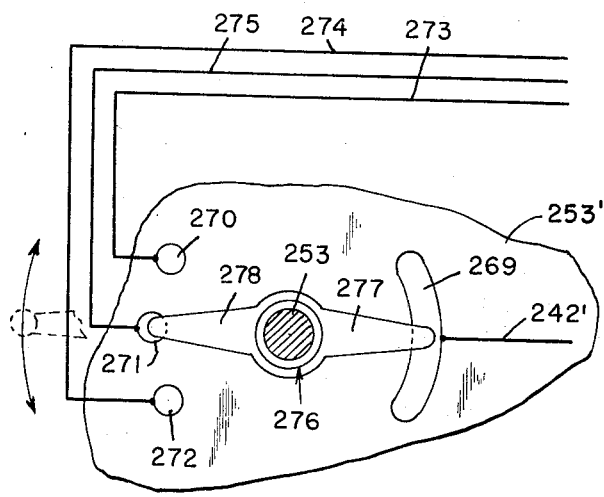

Fig. 22 is a diagrammatic illustration of one form of a control switch which may be used in the circuit layout of Fig. 21.

Fig. 23 is a view in elevation of the front side of a distributor unit showing another mounting arrangement for the same.

Fig. 24 is a view in side elevation of the distributor unit and mounting means therefor shown in Fig. 23.

Fig. 25 is a top plan view of a more or less diagrammatically illustrated automotive vehicle chassis frame with the supporting running gear and showing the positions of the hydraulic elevating units together with one preferred means of locating and supporting the rear hydraulic elevating units and the coil springs associated therewith.

Fig. 26 is a transverse sectional view taken substantially on the line 26—26 of Fig. 25 and looking in the direction of the arrows and also showing a portion of a transverse beam broken away.

Fig. 27 is a sectional view taken substantially on the line 27—27 of Fig. 25.

Fig. 28 is a sectional view on an enlarged scale of the electric solenoid actuating valve of a hydraulic elevating unit, together with portions of adjacent surrounding structure.

Fig. 29 is a bottom plan view of the left side rear suspension spring supporting plate.

Fig. 30 is a partial section taken substantially on the line 30—30 of Fig. 13.

Referring now more particularly to the drawings, the numeral 10 generally designates, in Fig. 1, one of the four hydraulic elevating units of the present invention which support the vehicle body upon the vehicle running gear through interposed supporting or suspension spring elements and Fig. 2 illustrates one of such units on an enlarged scale and in longitudinal section.

As shown in Fig. 25, one of the hydraulic elevating units is located adjacent to each of the vehicle wheels and is connected between the chassis frame and the supporting spring, as previously stated, the unit shown in Fig. 1 being located at the left front side of the vehicle and shown in normal chassis frame elevating position. When the vehicle is standing or running on a level surface with the vehicle body horizontal or balanced, each of the four units 10 will be in the elevating position shown in this figure.

The four units 10 in the part thereof which is interposed between a spring and the chassis frame are of identical construction and function in the same manner and, accordingly, the description of one, as illustrated on an enlarged scale and in section in Fig. 2, will apply to all.

A description will first be given of the unit 10 and its mounting upon the knee action new type combination steering knuckle-spindle bolt assembly of a front wheel, after a general reference to the chassis frame and running gear parts.

The chassis frame structure illustrated in Figs. 1 and 25, is more or less diagrammatic and is not intended to illustrate the exact or specific construction of any standard type of vehicle. In these figures, the reference numeral 12 generally designates the chassis frame which comprises the longitudinal side beams 14 while the reference character 16 designates the transverse front member which is here illustrated as an upwardly opening channel.

Adjacent to the rear end of the frame is the transverse beam 18 connecting the side beams 14 and forwardly of this transverse beam is the axle housing 20, at the outer ends of which are located the rear wheels 22. The other parts illustrated at the rear of the chassis frame and the means for supporting the springs of the units 10a between the rear end of the chassis frame and the rear axle housing 20 will be hereinafter set forth in detail, the supports for the rear springs being slightly different from those for the front springs.

The numeral 24 designates a front transverse member, which corresponds to and functions as a front axle, which is connected to the overlying transverse beam 16 of the frame by the vertical supporting columns 25.

To the outer ends of the frame front cross member 24, are connected in a conventional manner the arms of the knee action unit which is generally designated 26 and wherein the upper and lower arm assemblies are respectively designated 27 and 28. These are pivotally joined at 27a and 28a in the conventional manner to the upper and lower ends of the steering pin 29 with which the front wheel 30 is connected in accordance with standard practice. The numeral 29a designates a portion of the steering mechanism by which the wheel is turned through the medium of the conventional steering mechanism, one element of which conventional steering mechanism is attached to the steering arm 29b. Since all of this knee action unit structure and the coupling means between the same and the front wheel is of standard design, it is not believed that further or more detailed description of the same is required other than to designate the threaded upper end portion 31 of the steering pin 29 with which the lower end of the spring rest 32 of a front hydraulic elevating unit is connected.

The outer ends of the front transverse member 16 are formed with the web portion of the beam, designated 16', at an upward and outward inclination as shown in Fig. 1, and this inclined portion of the web is cut out to form the keyhole shaped opening 33, the circular portion of which is at the outer end of the beam while the narrower straight portion 33' extends inwardly. The outer end of the beam in which this keyhole slot 33 is formed may be enlarged and made circular as shown in Fig. 16 at 16" if desired.

Also, the web portion 16' of the front transverse member 16 is provided at the outer end of the keyhole slot 33 with the short elliptical opening 34, for the hereinafter stated purpose, the axis of which opening extends in the longitudinal direction of the keyhole slot.

*The hydraulic elevating unit*

The spring rest 32 of each front unit 10 comprises a cup body 35 having opposite sides cut away as illustrated in Fig. 2 to form the side openings 36. The bottom portion of the cup body designated 37, which lies between the openings 36, has the downwardly opening threaded socket 38 in which is threadably engaged the upper end portion 31 of the steering pin 29.

The front portion of the cup body 35 is encircled in a plane slightly below the rim 39, by the outwardly projecting flange 40.

The flange 40 forms a seat for the lower end of the helical spring 41 of the vehicle running gear and the rim portion 39 of the cup fits into the lower end of the spring as illustrated in Fig. 2.

The numeral 42 designates a hydraulic cylinder which is of an overall diameter materially less than the inside diameter of the coil spring 41 and of the rim 39 of the spring rest. This cylinder comprises the wall portion 43, the bottom or end wall 44 and the relatively wide encircling collar 45 which is integral with the top end of the cylinder as shown. This collar 45 provides a rest against the top end of the spring 41 bears and integral with the collar and extending downwardly from the underside is the annular flange 46 which engages in the spring thereby keeping the spring centered with respect to the cylinder.

The wall 44 in the bottom of the cylinder 42 has an axial opening 47 therethrough in which is positioned a stem 48 forming a part of an anchor lug 49 which is located within the cylinder and through which is formed the transverse passage 50.

The stem 48 of the anchor lug is secured in the opening 47 by the machine screw 51 which is threaded upwardly into the threaded bore in the stem as illustrated in Fig. 2, the head of the screw bearing against a washer 52 which positions against the outer side of the wall 44.

Slidably positioned in the cylinder 42 is a tubular piston 53, the lower end of which is open and has an axial passage 54 therethrough. This end portion of the piston is provided exteriorly with the encircling packing ring channel 55 in which is located the packing ring 56 which has tight sliding contact with the inner wall surface of the cylinder.

Formed integrally with the top end of the tubular piston 53 is a flat circular casting 57 which is formed with the interior chamber 58 into which the upper end of the piston 53 opens and extending radially from a side of this casting 57 is a coupling nozzle 59 having the axial passage therethrough which leads into the chamber 58. This chamber 58 forms the fluid receiving or inlet chamber from which the operating fluid passes through the piston 53 into the cylinder 42 as hereinafter described.

The numeral 61 generally designates a unitary structure which comprises an upstanding housing 62, preferably of circular formation and a flat body 63, corresponding in form to the casting 57 and formed integrally with the bottom wall 64 of the housing.

The body 63 is formed with the fluid receiving chamber 65 and with the radially extending fluid outlet nipple 66 through which is formed the passage or bore 67 which communicates with and leads from the chamber 65.

The top of the casting 57 has a central opening 68 therethrough and the bottom of the chambered body 63 has formed integral therewith and extending downwardly therefrom, a tubular nipple 69 which, when the body 63 is mounted upon the top of the casting 57, extends through the passage 68 in which it is tightly fitted to prevent leakage of fluid through the opening or passage 68 around the nipple.

For further assuring a tight connection between the bodies 57 and 63, a suitable gasket 70 is interposed therebetween in encircling relation with the nipple 69. The unit 61 is securely fastened to the top of the casting body 57 by screws 71 which are passed through suitable openings 72 formed through inwardly extending lugs 73 which are cast integral with the wall of the body 63 and extend into the chamber thereof as shown in Fig. 8, and into suitable threaded openings in the top of the casting body 57 as indicated at 74. The heads of the screws 71 are countersunk in the sockets 75 formed in the floor or bottom 64 of the housing 62, which countersinks extend into the upper parts of the lugs 73 as is clearly illustrated in Fig. 2.

Securely fitted in the nipple 69 is one end of a fluid return tube 76. This tube extends downwardly through the tubular piston 53 on the axial center thereof and is of reduced diameter through a portion of its lower end forming the bore 77. The wall of the lower portion of the fluid return tube in which the bore 77 is formed, has a number of radial openings 78 leading into the bore 77, which openings function in the nature of a safety means in the operation of the apparatus, as hereinafter set forth.

The tube 76 extends through the major portion of the length of the piston 53 as shown, and extending thereinto and snugly fitting in the bore 77 is a plunger rod 79 which functions, as hereinafter set forth, in the nature of a valve element for controlling the elevation of the piston 53 in the cylinder 42.

The lower end of the plunger rod 79 is reinforced by the short sleeve nut 80 which is threaded thereon and formed transversely through this nut and through the end of the plunger is the opening 81.

The lower end of the plunger rod 79 is coupled with the anchor lug 49 by a suitable coupling means, the coupling here shown being in the form of a substantially U-shaped link 82, one leg of which passes through the opening 81 in the lower end of the plunger rod while the other leg passes through the opening 50 in the anchor lug, the free ends of the legs of this link being connected by suitable means such as a cotter key 83 or the like. Thus it will be seen that as the piston 53 and the fluid return tube 76 move in the cylinder 42, the tube 76 will slide on the rod 79 as the latter is coupled to the non-moving lower end of the cylinder 42. The coupling means in the form of the link 82, here shown, provides a suitable flexibility in the event of any slight misalignment between the moving and stationary members.

The bottom 64 of the housing 62 has a central opening 84 therethrough which is defined by an annular upstanding flange 85 forming a retainer socket for a ball bearing unit which is generally designated 86. This unit is of a conventional type having inner and outer races 86a and 86b, the outer race 86b being tightly engaged within the annular flange where it is retained by a centrally apertured hold-down plate 87, as illustrated in Fig. 9, which plate is provided with laterally extending ears 88 which are secured by screws 89 to the floor or bottom of the housing.

The housing 62 encloses a valve operating electric motor unit which is generally designated 90.

The valve controlled by the motor unit 90 comprises a stem 91 of substantial length which has intermediate its ends an encircling shoulder 92 which is located in the opening 84 in the housing bottom or floor 64 as shown in Fig. 2.

The inner race of the bearing unit 86 encircles the upper portion 93 of this valve stem and is cross fitted or otherwise firmly secured thereto so that the valve stem is supported against axial movement in the opening 84.

The upper portion 93 of the valve stem terminates in the reduced threaded stud 94 by which the valve stem is connected to the armature of the motor in the manner hereinafter set forth.

Below the shoulder 92, the lower portion 95 of the valve stem is axially bored to provide the passage 96 which opens through the bottom end of the stem as illustrated. This lower portion 95 of the valve stem extends downwardly into the fluid return tube 76 in which it has a relatively tight or snug fit but is designed to turn in the tube.

In the part of the lower portion 95 of the valve stem which passes through the chamber 65, the wall of the stem is provided with outlet openings 97 which maintain constant communication between the passage 96 and the chamber 65.

Adjacent to the lower end of the lower portion 95 of the valve stem, the wall is provided with a series of radial ports 98 and in matching planes transversely of the tube 76, the fluid return tube is provided with inlet ports 99 which, when the valve stem is turned to valve open position, align with the ports 98 to permit fluid to pass from the hollow piston 53 into the passage 96 and from there through openings 97 into the fluid return chamber 65.

The valve operating motor 90 in the housing 62 comprises an armature generally designated 100 which includes a bar portion 101 having a threaded aperture 102 intermediate its ends in which is received the threaded upper end portion 94 of the valve stem whereby the bar 101 is maintained transversely of the upper end of the stem as shown in Fig. 2 and each end of the bar portion 101 has formed integral therewith the upwardly extending arm 103. These arms are in spaced parallel relation and equidistantly spaced from the axial center of the stem as shown and for the purpose about to be described.

The top of the housing 62 is closed by the top or cover plate 104 between which and the supporting edge of the housing wall is a gasket 105, the cover being held in place by cap screws 106, as shown, which are threaded into inwardly extending lugs 107 forming a part of the wall of the housing.

Extending through the center of the housing cover 104 is a screw 108, the lower end of which is threaded into an end of a brass stud 109 which is suspended in the center of the housing from the under side of the cover as shown.

The lower end of the stud 109 is secured in a suitable manner to the central portion of a transversely disposed electromagnetic core 110 on which are supported at opposite sides of the stud 109 the magnet coils 111 which are electrically connected in series.

An end of one of the coils 111 is electrically connected by the conductor 112 to a ground terminal 113 carried by the housing cover plate.

Also carried by the cover plate 104 is electrical terminal 114 which, as shown in Fig. 2, is insulated from the cover plate and is electrically connected by the conductor 115 with an end of the other coil, the adjacent ends of the coils being electrically connected as indicated at 116 so as to put the coils in series relation as previously stated.

Upon reference to Fig. 3, it will be seen that the pole ends of the electromagnet core 110 are in axial alignment and are spaced to have the inner faces of the armature arms 103 swing thereacross in close proximity thereto whereby, upon energization of the magnets, the arms will be attracted to move in the expected manner to a position across the ends of the magnet cores. As shown in Fig. 3, one of the arms 103 is slightly offset in a circular path from the other arm or, in other words, is out of line with the other arm so that when one arm 103, such as the arm designated A, is attracted to a position where it is centered with respect to the adjacent magnet pole as indicated in dotted lines in Fig. 3, the other arm designed B, will be only part-way across the pole piece of the adjacent magnet.

As best seen in Fig. 3, the rotative movements of the armature between the valve on position and the valve off position are limited by stops 117 and 118 which may be of any suitable character such as upstanding pins mounted in the bottom or floor of the housing and located at opposite sides of the armature arm 103A. When the electromagnets are energized, the armature will be turned to the valve on position in which it is shown in dotted lines in Fig. 3 and when such valve on position is reached, the arm 103A will be in contact with the stop 117.

Figure 5:
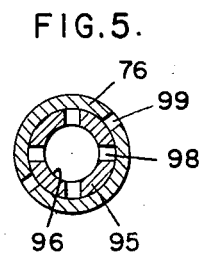
Fig. 5 is a section taken substantially on the line 5—5 of Fig. 2 showing the closed relation of the valve ports.
Figure 6:
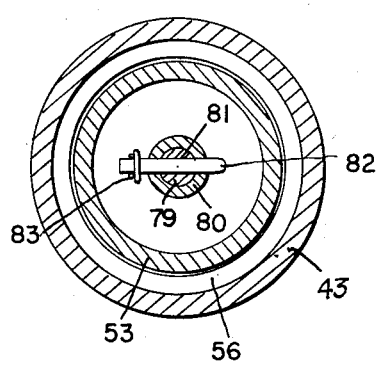
Fig. 6 is a horizontal section taken substantially on the line 6—6 of Fig. 2 and on an enlarged scale.
Figure 7:
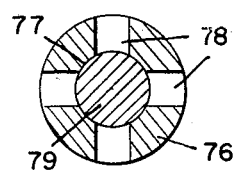
Fig. 7 is a section taken substantially on the line 7—7 of Fig. 2, on an enlarged scale.

When the magnets are de-energized, the armature is rotated to a valve off position where the ports 98 and 99 will be out of registry as shown in Fig. 5, by a spring 119 which is secured in a suitable manner, as indicated at 120, to a fixed part of the housing while the opposite end is attached as indicated at 121 to the end of the armature bar from which the arm 103A extends, and the movement under the urge of this spring will be limited by engagement of the armature with the stop element 118 as illustrated.

By offsetting one of the armature arms in a circumferential direction from the other or greater than 180°, a more positive control valve actuation is assured by providing multiple or successive stages of magnetic attraction between the magnet poles and the adjacent affected armature components.

The amount of offset of the arm 103B beyond 180° from the opposite arm is illustrated by the bracketed radius lines $B^1$ and $B^2$ in Fig. 3, and it will accordingly be apparent that the spacing between this arm 103B and the adjacent magnet pole by which it is attracted, is considerably greater than the spacing between the arm 103A and the adjacent magnet pole which attracts it. As a result of this spacing differential, there is a primary stage of movement imparted to the armature by the attraction of the arm 103A and a secondary stage of movement when the armature arm 103B comes into the field of influence of the adjacent magnet pole and after the arm 103A is under the full influence of the adjacent magnet pole and is engaging the stop 117, a magnetic pull will continues to be exerted on the arm 103B by its adjacent pole piece. Thus the valve opened by the rotating armature will be held steady or firmly in its open position.

The body 63 which is integral with the bottom of the housing 62 is encircled in the plane of the housing bottom 64 by an outstanding flange 117a and secured to the top of this flange to extend upwardly therefrom, is a stud 118a which is at the side of the housing 62 diametrically opposite from the nipple 66.

Each of the front units 10, when mounted as shown in Fig. 1, has the housing 62 thereof extended upwardly through the opening 33 in the end of the overlying front transverse member 16, the diameter of the housing being such as to snugly fit in this opening and the stud 118a engages in the aperture 34 so as to prevent any turning movement of the housing in the opening. The fluid conduits connected with the nipples 59 and 66 will then be disposed beneath the reduced or narrow part of the opening and this narrow reduced part, designated 33', provides space for carrying electric current conductors, hereinafter referred to, to the terminals 114.

As previously stated, the cylinders of the several units 10 are filled with fluid under pressure, the fluid being supplied from a reservoir 119', which is preferably supported in a suitable manner as, for example, by means of a bracket 120' and clamping bands 121' (Fig. 18) in the front of the motor vehicle adjacent the radiator and at as high an elevation as possible beneath the hood. Fig. 10 shows the radiator diagrammatically and is generally designated 122, the reservoir 119' being diagrammatically illustrated as at the right of the radiator.

The reservoir comprises a suitable closed receptacle or tank 123 having a filling nozzle 124 at its top, closed by the cap 125 and leading from the filling nozzle is a short downwardly directed vent tube 126.

The bottom 127 of the reservoir is provided with an outlet nipple 128 and an inlet or fluid return nipple 129.

A suitable means is provided for regulating the outflow or withdrawal of liquid from the tank 123, such means being illustrated as in the form of a needle valve comprising the stem portion 130, the lower end of which is tapered as indicated at 131 to extend into the opening at the inner end of the outlet nipple. The valve stem at its upper end is threaded as indicated at 132 and passes through and is threadably engaged in guide collar 133 through which it extends to the outside of and above the tank. The top end of the valve stem 130 has a knurled head 134 thereon and carries a depending resilient spring securing finger 135 which is adapted to engage in a peripherally notched nut 136 carried at the top end of the guide 133 as shown in Fig. 18 whereby upon rotating the needle valve to a desired position, the spring holding finger 135 will maintain the valve against movement under the action of vibration.

The numeral 137 designates generally a pumping unit of a suitable character for withdrawing liquid from the reservoir and moving it under pressure through suitable conduits to the inlet nipples 59 of the units 10.

No illustration of the internal construction of the pumping unit is given as it is believed that it will be readily apparent that any suitable type of pump may be employed, such as a gear pump or the like, and preference is had for a pump having two discharge chambers or outlet sides supplying the fluid under pressure to outlet nipples 138, the inlets to the pump chambers being by way of suitable ports 139 leading from a manifold 140 into which leads a fluid supply conduit 141 which is connected to and leads from the outlet nipple 128 of the tank 123.

The numeral 142 designates a pulley wheel which is operatively coupled with the gear mechanism within the pump and by which the fluid is transmitted from the manifold through the pump housing to the outlets 138. The pump structure is mounted in any suitable position and by any suitable means upon the vehicle chassis in a position adjacent to the fan belt pulley of the motor vehicle, which pulley is replaced by a double grooved pulley for the purpose of coupling the pulley 142 with the fan belt shaft for the operation of the pump therefrom. Accordingly, it will be seen that the fluid pumping unit will be operated only when the vehicle engine is running and while it has been stated that a belt connection is made with the fan belt pulley or some other suitable part of the motor vehicle to take power from the vehicle engine, it will, of course, be obvious that any other suitable means may be provided for operating the pump unit, if desired, such as an electric motor or the like.

It is also pointed out that while a twin pump structure has been illustrated and described having the two pressure outlets 138, use may be made of a single pump unit having a single pressure outlet from which to supply the cylinders of the elevating units. This twin pump is of the same character as that used with power steering for motor vehicles excepting for the provision of two outlets from one common intake and preference is had for the twin unit so as to provide positive maximum pump pressure of liquid to individual pairs of the body elevating units on the two sides of the body, in the manner hereinafter described, or to provide maximum pressure to only the pair of units on one side of the car body when required.

In the operation of the present system, the two units 10 on the right-hand side of the vehicle are connected in the fluid and electrical system to operate together and the two units 10 on the left-hand side of the vehicle are also connected in the fluid and electrical system to operate or function together as hereinafter set forth.

Referring to Fig. 10, it will be seen that the pump outlets 138 have leading therefrom the fluid supply conduits 143 each of which connects with a pipe line 144 leading to two units 10 on one side of the vehicle. Each of these pipe lines 144 is connected with the inlet nipple 59 of a unit 10. Thus it will be seen that one pump outlet 138 supplies fluid to a pair of units 10 on one side of the vehicle body and the other pump outlet 138 supplies fluid to the pair of units on the opposite side of the vehicle body.

Connected with the fluid return nipple 129 of the reservoir or tank 123 is a pipe or conduit 145 which is connected by pipes 146 with the outlet nipples 66 of the several units 10. Thus, when the rotary valve stems of a pair of units 10 on one side or the other of the vehicle are turned to open position as illustrated in Fig. 19, the fluid moving under pressure from the pump will enter the hollow pistons 53 of the units by way of the nipples 59 and flow through the registering ports 98 and 99 to pass through the passage 96 of each valve stem into the fluid outlet chamber 65 of each unit and pass from there, through the outlet nipples 66, to the return conduits 146 and 145 leading back to the reservoir.

*Electrical system including valve turning motors with selective automatic and manual operation*

To facilitate an understanding of the following description, it will here be stated that when the vehicle motor is in operation and the pump is also functioning to distribute fluid under pressure to the four hydraulic elevating units, an equal pressure will be set up in each of the cylinders to effect the upward movement of the piston therein to a predetermined extent or elevation.

The extent of movement of each piston 53 outwardly from the cylinder and the elevation of the parts thereover is controlled by the ports 78 in the fluid return tube 76. When the piston rises to the point where the end of the plunger rod 79 uncovers the port 78 then the fluid will return to the reservoir by way of the valve stem passage 96, the ports 97 and the chamber 65 which leads to the return conduits. Since all of the pistons rise to the same extent, the vehicle body will maintain a level condition if the vehicle is standing upon a level surface and, accordingly, it will be understood that when the vehicle is in operation the body will be elevated by this means and supported by the entrapped pressurized hydraulic liquid.

During the period that the body is elevated in the manner above described, the valve controlling armature will be in the valve closed position in which it is illustrated in full lines in Fig. 3 so that the ports 98 and 99 will be out of registry.

In Fig. 11, the numeral 147 designates a portion of a diagrammatcially illustrated motor vehicle instrument panel and the numeral 148 designates a portion of a diagrammatically illustrated dashboard which is positioned forwardly of the panel 147.

The numeral 149 designates the ignition switch unit of the motor vehicle and the numeral 150 designates the vehicle battery which is grounded on one side in the customary manner as indicated at 151 and which has a conductor 152 leading from one side of the ignition switch to the ground side as shown.

The numeral 153 designates a conventional relay unit into which are connected the conductors 154 and 155 leading respectively from the battery and from the other side of the ignition switch.

The numeral 156 generally designates the electrical distributor for the elevating units by which electric current is transmitted to one or the other of the two pair of body elevating units.

One means of mounting the distributor unit 156 is illustrated in detail in Fig. 12. As shown in this figure, there is provided a substantially L-shaped mounting bracket which is generally designated 157 and which comprises a vertical arm 158 which is bolted or otherwise secured as indicated at 159 to the front side of the dashboard 148, and a horizontal arm 160, which extends forwardly from the dashboard.

The vertical arm 158 has an aperture 161 which registers with opening 162 in the dashboard for the passage of the hereinafter described shaft.

Supported upon the horizontal arm 160 is an upright, substantially U-shaped yoke 163 comprising the two spaced arms 164 and 165 connected by the horizontal portion 166 which rests upon the bracket arm 160 and is bolted thereto as at 167 or otherwise secured to the bracket.

The arms 164 and 165 have apertures 168 which are aligned with one another and with the aperture 161 and opening 162 and in each of the apertures 168 is a cushion bearing 169.

The instrument panel 147 supports a bearing 170 which is aligned with the opening 162 and in which is rotatably mounted a short shaft section 171 which forms an element of a multiple jointed manual control shaft which is generally designated 172 by means of which manual turning or oscillation of the distributor unit may be accomplished if and when desired. This multiple shaft unit comprises a second shaft section designated 173 which is located between the instrument panel 147 and the dashboard 148 and is connected at its back end by a universal coupling 174 with the first shaft section 171 while the forward end of this second section is connected by a universal coupling 175 with a third shaft section 176 which passes through the adjacent cushion bearing 168 as shown in Fig. 12.

Extending through the bearing 169 in the forward vertical arm 164 of the U-shaped yoke is an end of a fourth shaft section 177 which forms the terminal of the jointed shaft 172 and this rearwardly directed end of this shaft section 177 is coupled to the forwardly extending end of the third shaft section 176 by the coupling sleeve 178 which carries the binding screws 179 which engage in the inserted ends of the shaft sections in the manner shown to rigidly couple the same together.

The end of the first section 171 of the jointed shaft carries a head 180 which is positioned at the front of the instrument panel so that the shaft can be rotated manually when desired.

The distributor 156 comprises a flat or shallow housing having a forward wall 181, the top wall 182 and side walls 183 which converge downwardly and are joined by the curving or arcuate bottom wall 184.

The rear side of the distributor housing is closed by the back wall plate 185 which is secured in closing position by suitable means such as cap screws 186 which are extended into threaded bosses 187 which may be cast on the inner side of the side walls 183 as shown in Fig. 13.

The back wall cover plate 185 has a circular boss 188 on the outer side adjacent to the top thereof and through this boss is formed an opening 189 through which the forward end of the shaft section 177 extends as shown in Fig. 14.

In line with the opening 189, the front wall 181 has an aperture 190 therethrough and the forward end of the shaft portion 177 abuts the forward wall and has a threaded socket 191 in the end thereof which aligns with the opening to receive the threaded mounting pin 192. This pin extends forwardly of the wall 181 and receives a securing nut 193 so that by this means the shaft portion 177 is securely coupled to the front wall of the distributor housing whereby rotation of the shaft unit 172 of which the forward portion 177 is a part, will effect the turning of the distributor housing.

In order to facilitate the setting of the distributor housing in a level position so that the hereinafter described pendulum action actuated circuit closing contacts will be held in a desired open position, there is mounted upon the top of the wall 182 a spirit level 194.

Disposed across the top of the wall 181 within the housing is an insulation fiber strip 195 which is held in slightly spaced or offset relation with the surface of the wall by two bosses 196 and the front wall 181 has apertures 197 formed therethrough and through the bosses 196 to receive electric terminal pins or screws 198 which pass through the apertures and through suitable insulation sleeves therein as indicated at 199. These terminal screws or pins pass through the insulation strip from the inside and receive on their outer ends the binding nuts 200.

Each of the terminal screws 198 secures against the inner side of the insulation strip 195 one end 201 of a substantially L-shaped contact which is generally designated 202, the other end portion or leg of which extends forwardly in the housing substantially at right angles to the portion or leg 201 as indicated 203 and carries upon its under face the contact point 204.

Substantially midway between the terminal screws 198 the wall 181 has extended therethrough and suitably insulated therefrom the main terminal 205 which at its inner end passes through the insulation strip and has attached thereto two leads 206 and 207, the lead 207 being connected with an ignition type condenser 208 as shown in Fig. 13.

Mounted upon the section 177 of the shaft unit 172, within the distributor housing 156, is a bearing unit which is generally designated 209. The inner race 210 of this bearing unit is fixed to the shaft section while the outer race 211 is free for rotation in the customary manner.

Encircling the outer race 211 of the bearing unit is an insulation band 212 of fiber or other suitable material.

Secured to the outer race of the bearing unit is a movable current distributor which is generally designated 213 and which comprises two semi-circular clamping members 214 and 215 which are in opposed relation and have the bearing unit and the insulation band around the outer race interposed between them and one of these parts of the clamping unit has the short lateral ears 216 which are in opposed relation with and secured to the laterally and oppositely extending contact arms or blades 217 each of which extends across a leg 203 of a fixed terminal and carries a contact point 218 for electrical connection with an opposed point 204 of an adjacent terminal 202. The parts 216 and 217 are tightly secured together by the coupling screws 219 as illustrated in Fig. 13.

As illustrated in Fig. 13, the lead wire 206 is electrically connected with one of the screws 219 so that electric current is led therethrough to the movable switch arms or blades 217 for passage to one or the other of the terminals 202 upon oscillation of the blades.

Attached to the lower part 214 of the bearing encircling clamp, by the depending pin 220, is a pendulum weight 221. This weight is shown as being in the form of a relatively thick disc member having a central bore or passage 222 therethrough into which the lower end of the pin extends, the weight being adjustably secured upon the suspending pin by suitable means such as the set screw 223. This pendulum functions when the motor vehicle body becomes transversely unbalanced from a level state to complete a circuit including a pair of hydraulic elevating unit motors on one side of the vehicle to open the valves of such units and effect the restoration of the vehicle body to a transverse level condition as will be hereinafter described.

The pendulum weight constitutes what might be termed a primary control actuator for the circuit closing means which includes the two movable contact arms or blades 217 and, as will be readily apparent, if the pendulum were entirely free swinging, swaying movements of the vehicle might result in back and forth movement of the pendulum which would result, in turn, in an undesirable opening and closing of the circuits.

Accordingly, a secondary control means is associated with the pendulum which has a dampening action upon the swinging movement of the pendulum. This secondary control comprises a fiber tongue or blade 224 which has an edge secured in a radial slot 225 in the body of the pendulum and extends downwardly from the center of the pendulum toward the curved bottom wall 184 of the housing as shown in Fig. 13.

The arc of movement of the center of the pendulum weight is struck from the axial center of the shaft section 177, which arc is designated, in Fig. 13, 223a, while the arcuate center for the inner surface of the bottom wall 184 is found at the point a below the center of the pendulum when the latter is hanging vertically. Accordingly, the curvature of the inner surface of the wall 184 is sharper than that of the arc 223a defined by the center of the swinging pendulum.

Resting upon the curved wall 184 are the two parallel rollers 226 which have pivot pins 227 extending axially therethrough and the adjacent ends of the pivot pins are coupled together by the links 228 which are of a length to maintain a spacing between the rollers slightly greater than the thickness of the tongue 224 so that when the pendulum swings, this tongue will have a slight free movement between the rollers before it will engage one or the other thereof. With this construction it will be seen that as soon as the pendulum has swung slightly in either direction the tongue 224 will engage one of the dampener rollers 226 and tend to force the rollers to ride upwardly on the inner curvature of the wall 184 so that the closing contact points 204—218 will not strike together sharply and cause a rebound of the pendulum.

Means is provided for preventing unintentional turning of the distributor unit and the supporting shaft therefor by the provision of the plate 229 which is adjustably secured against the boss 188 of the back wall plate 185 by screws 230 as shown in Fig. 15. As shown, the shaft section 177 extends through this plate 229 and the securing screws are engaged in arcuate slots 231 which are concentric with the shaft section 177.

One end of the plate has an arcuate flange 232 concentric with the adjacent shaft section and this flange has an edge recess 233, intermediate the ends of which is formed the notch 234. At each end of the recess 233, is a stop shoulder 235.

The vertical arm 164 of the yoke 163 is in closely spaced relation with the back wall plate 185 of the distributor housing, as shown in Fig. 12, and this arm carries the two vertically spaced pins 236 which extend toward the housing.

Supported by the pins 236 is a vertical arm 237 which has suitable apertures through which the pins 236 extend whereby the arm can shift freely on the pins toward and away from the housing and the upper end of the arm has the angularly extending finger 238, which, when the distributor unit housing is in set or level position, engages in the notch 234 of the cam flange 232.

The upper one of the two pins 236 carries a coil spring 239 which is interposed between the arm 237 and the adjacent yoke arm 164 and urges the cam finger arm 237 outwardly to maintain the cam finger 238 yieldingly in contact with the cam flange 232.

From this, it will be seen that when the distributor housing has been set in level position, the yieldable holding finger 238 will engage in the notch 234 to maintain the housing against accidental turning but if it is desired to manually turn the housing to effect the joining of the pair of electrical contacts 204—218 this can be accomplished by the operator of the vehicle by grasping and turning the knob 180 to turn the shaft 172 and the distributor housing at the outer or forward end thereof. In this turning action the spring pressed finger 238 will ride out of the notch 234 and onto the recessed portion of the flange, the turning movement of the shaft and housing being limited by contact of the finger with one of the shoulders 235.

As previously stated, the hydraulic elevating units function in pairs, that is, the two units on the right-hand side of the vehicle form one pair and the two units on the left-hand side of the vehicle form the other pair.

Upon reference to Fig. 11, it will be seen that the motor terminals 114 of the two units at the top of the figure are electrically connected by the current conductor 240 and the other two units are electrically connected by the current conductor 241.

To facilitate the following description, the units 10 connected by the conductor 240 will be identified as being on the right-hand side of the vehicle and the units 10 connected by the conductor 241 will be referred to as being on the left-hand side of the vehicle. Accordingly, the units at the left of the figure constitute those associated with the front wheels and the other two units would be those associated with the rear wheels.

The reference numeral 242 designates the conductor by which electric current is carried from the relay 153 to the main or central terminal 205 of the distributor.

The conductor 240 leading to the two hydraulic units on the right-hand side of the vehicle are electrically connected by the conductor 243 with the terminal 198 on the left side of the distributor unit while the conductor 241 between the hydraulic elevating units on the left-hand side of the vehicle is connected by the conductor 244 with the terminal 198 on the right-hand side of the distributor unit.

In addition to the means illustrated in Fig. 11 for manually effecting the actuation of the electric circuit closing means for the pairs of elevating units whereby the lowering of two of the car body elevating units on either side of the vehicle body can be brought about, Figs. 21 to 24 illustrate a means for effecting manually the distribution of electric current to the elevator units, which is combined with the hand lever of directional indicating signal lights such as the majority of motor vehicles are equipped with.

In Fig. 21, the numeral 245 designates a diagrammatically illustrated motor vehicle steering column housing or tube through which the steering column 246 extends from the steering wheel 247 to the steering mechanism (not shown).

The numeral 248 designates the steering wheel gear shift lever and the numeral 249 designates the control lever for the directional signal lights.

The lever 249 has operatively connected therewith the shaft 250 which is connected with the switch mechanism for the directional signal lights 251, the said switching mechanism being encased in the switch box 252. No details of this mechanism are illustrated since such mechanism is of standard construction and forms no part of the present invention.

In associating the present invention with the directional signal light operating mechanism of the vehicle, there is provided an extension shaft 253 which is operatively coupled with the directional signal light operating shaft 250 and this shaft extension 253 is operatively coupled with the switch unit which is generally designated 254 and details of which are diagrammatically illustrated in Fig. 22.

Provision is made for mounting the electric current distributor unit 254 upon any suitable part of the vehicle frame structure which extends transversely of the frame so that the distributor unit can be mounted on the longitudinal center of the vehicle. The distributor unit support is here illustrated as a channel beam 255 upon the top of which is mounted a bracket generally designated 256 and comprising a vertical portion 257 and a right-angularly extending horizontal foot portion 258 which rests upon the top of the support 255 and is secured thereto in a suitable manner as by means of bolts 259.

The distributor unit 254 is internally of the same construction as the previously described unit 156, therefore no detailed illustration is given of the pendulum and circuit distributing elements which the pendulum moves for directing electric current to the right or left hand units in accordance with the movements of the vehicle body from horizontal to a transversely inclined position such as would occur in the rounding of a curve or the unequal distribution of weight in the vehicle caused by passengers or other load imposing bodies.

The stub shaft 260 shown in Fig. 24 corresponds to the shaft portion 177 shown in Figs. 12 and 14 but this stub shaft terminates just outside the rear part of the distributor housing and is shown as having a transverse slot 261 in which a screw driver or other implement may be engaged to facilitate the turning of the shaft for the purpose of effecting a tight coupling between the shaft and the screw or bolt 262 which extends through the front wall of the housing and into the end of the shaft corresponding to the nut and screw assembly as shown in Fig. 14.

The upper end of the bracket arm 257 has an opening 263 therethrough to receive the head of the screw 262 as shown, and concentric with this opening the bracket arm has the two arcuate slots 264 which are at opposite sides of the opening as shown in Fig. 23 and through which extend the securing machine screws 265 which are threaded into suitable apertures in the adjacent wall of the distributor housing. It will thus be readily apparent that by loosening the screws 265 the housing can be turned as necessary to bring it to a level position as indicated by the spirit level 266 upon the top thereof whereupon the screws 265 are tightened so as to hold the distributor housing in set position.

Extending from the front side of the housing of the distributor unit 254 are the two transversely spaced terminals 267 corresponding to the terminals 198 and a central terminal 268 corresponding to the previously referred to terminal 205 to which the hot wire of the electric system is connected.

In Fig. 21, the pairs of hydraulic elevating units on the right and left hand sides of the system are designated 10', the same being diagrammatically represented as in Fig. 11. The pair of units on the right side of the vehicle are shown electrically connected by the conductor 240' while the pair of units on the left side are shown electrically connected by the conductor 241'.

The left side units 10' are electrically connected with the distributor terminal 267 which is upon the right-hand side of the distributor, by means of the conductor 244' while the pair of units 10' on the right side of the vehicle are shown electrically connected with the terminal 267 on the left side of the distributor unit by the conductor 243'.

The hot wire by which electric current is carried from the relay of the vehicle electrical system for distribution through the switch structure 254 to the elevator units either under manual control or automatic control, is designated 242'.

Referring to Fig. 22 wherein are illustrated the elements within the housing of the switch unit 253', there is shown a relatively long arcuate terminal plate 269 which is concentric with the shaft 253 and with which the hot wire 242' is connected. Thus, the central terminal of the distributor is potentially energized for automatically controlling the elevating units.

Arranged in an arcuate path concentric with the shaft 253 are three electrically separated fixed contacts 270, 271 and 272. The contact 270 is connected by the current conductor 273 with the conductor 243' leading to the right side of the pair of elevator units 10' and the conductor 274 is electrically connected with the conductor 244' leading to the left side pair of elevator units 10'.

The central terminal 271 is electrically connected with the hot wire terminal 268 of the distributor unit 254 by the conductor 275.

Attached to the shaft 253 for rotation therewith about the axis of the shaft is a dual blade current transfer unit 276 which is electrically insulated from the shaft 253 and includes the pair of diametrically opposite radially extending contact blades 277 and 278. The blade 277 has permanent wiping contact with the terminal strip 269 and the free end of the blade 278 is adapted to have selective contact with the terminals 270, 271 and 272 to carry over electric current from the long contact strip 269 to one of these individual contacts.

Reference to Figs. 21 and 22 will show that under manual control for electrically causing the lowering of two elevating units on one or the other side of the vehicle body, through the medium of the directional signal light lever 249, as soon as said signal light indicating lever is moved for its intended purpose the switch blade 278 will be shifted from contact 271 to thus break the flow of electric current to the central terminal 268 of the distributor housing 254. By this action, control of the electric circuits for the hydraulic elevating units is taken away from the automatic pendulum operated mechanism so that the desired manual control would not be interferred with by the movement of the pendulum in the automatic distributor. In other words, when the directional signal light lever is set for a right or left steering indication, the electrical energy distributor contact points are intentionally made ineffective as will be readily apparent from the wiring diagrams.

The description hereinbefore given of the means for supporting the coil springs upon which the hydraulic elevating units are mounted, has been directed to the front end mounting only.

In Figs. 25, 26 and 27, there is illustrated a means for mounting the vehicle body suspension springs and the hydraulic units at the rear of the vehicle body. While, obviously, other means might be employed for supporting the rear springs and hydraulic elevating units, the structure here disclosed is preferred. In this construction, there are shown two radius rods 269 which are disposed to extend in forwardly converging relation from the rear axle housing 20 and which have their forward ends attached by suitable ball and socket connecting means 270 of a conventional character to the under side of the chassis frame cross member 18 as shown.

The rear ends of the radius rods 269 are connected with or formed integral with spring and hydraulic elevating unit supporting plates, one of which plates is designate 271 while the other plate is designated 272. One of these plates, here shown as plate 271, passes beneath the rear axle housing 20 at the left side of the chassis frame and is secured against the under side of the housing by suitable U bolts 273 while the other plate, here shown as the plate 272, is disposed at the right side of the chassis frame and is secured against the under side of the rear axle housing by the U bolts 274.

The plates 271 and 272 are of substantial length, as shown, and each extends rearwardly beyond the axle housing.

Rearwardly of the U bolts 273 the plate 271 has an opening 275 therethrough and rearwardly of this opening, there is formed integral with the plate the laterally extending and upwardly directed arm 276 which terminates in an eye 277, the opening through which is directed longitudinally of the frame.

The opposite plate 272 extends beyond the rear axle housing and the U bolts 274 as shown and is provided, like the plate 271, with an aperture 278 for the purpose hereinafter stated.

At a position to the rear of the plate 272 the side beam 14 of the chassis frame has secured to the under side thereof, as indicated at 279, a plate 280 which carries a downwardly and inwardly directed tie rod arm 281 which terminates in an eye 282, the aperture of which is directed longitudinally of the vehicle and this eye is at approximately the same elevation as the eye 277 and is disposed in a transverse vertical plane slightly rearwardly of the latter eye.

The numeral 283 designates a tie rod which extends transversely of the chassis frame and has an eye 284 at one end which is positioned against the forward side of the eye 282 to which iti s pivotally coupled by the pivot bolt 285 while the opposite end of the tie rod 283 has an eye 286 which positions against the eye 277 and is pivotally coupled therewith by the pivot bolt 287.

Extending transversely of the chassis frame between the side beams 14 is a tie beam 288 which is here shown as being in the form of a channel iron in which the channel is directed downwardly and the ends of this beam are secured by bolts, rivets, welding or any other suitable means, to the side beams of the chassis frame.

The tie beam 288 lies over or above the apertured portions of the plates 271 and 272 and is provided with key-hole shaped openings 33a corresponding to the openings hereinbefore described.

Each of the plates 271 and 272 supports over and in coaxial relation with the aperture therethrough, a coil spring 41a corresponding to the hereinbefore described springs 41 and interposed between the top end of each of these springs 41a and the tie beam 88 is a hydraulic elevating unit which is generally designated 10a and which is of the same construction as the front units 10 hereinbefore described in detail. Since these units are the same in all particulars as the front units which have been illustrated and described in detail, no detailed description is given or illustration shown of the rear units 10a As shown in Figs. 26 and 27, the housing 62a at the top of each of the units 10a extends through one of the apertures 33a adjacent thereto, the flanged portion of the housing corresponding to the flange 117a having the tie beam 288 resting thereon.

The rear end construction here disclosed and described functions to fix the relationship between the car body frame and the rear axle through the medium of the tie rod 283 connected with the arms 276 and 281 which are respectively attached to the plate 271 on the left side of the frame and to the frame chassis beam 14 at the right side of the frame.

It will be readily apparent from the foregoing, that when the rear hydraulic elevating units receive pressurized fluid in the cylinders thereof, at the same time that such pressurized fluid is received in the cylinders of the front units, the entire chassis frame will be elevated in a horizontal or transversely level manner.

*Operation*

In the description of the operation of the present invention, it will be assumed that the motor vehicle engine is at rest or not running, in which case, of course, the fluid circulating pump 137 will be idle. Under these conditions, the piston 53 of each of the hydraulic elevating units will be at the limit of its inward movement in its cylinder 42 and the parts will be in the position illustrated in Fig. 2.

The circuit control or electric current distributor unit will have been previously properly adjusted so that when the spirit level 194 upon the housing thereof indicates that the unit is in level position, the pendulum 221 will be vertical and the contact points 204 and 218 at the right and left hand sides of the distributor unit will be spaced apart as illustrated in Fig. 13. The pendulum 221 will maintain the contacts separated so long as the vehicle body is transversely level.

When the ignition switch 149 is turned on, the conductor 242 will be charged with current to the central terminal 205 of the distributor unit.

When the motor vehicle engine is started, the dual pump which is connected with the vehicle engine for operation thereby, will be set into operation and the two pumping chambers of the pump will draw fluid from the manifold 140 which is connected with the fluid reservoir 119' by the conduit 141 and such fluid will be discharged into the right and left feed lines or conduits 144, each of which serves two hydraulic units on one side of the vehicle. The hydraulic fluid will accordingly be forced into each of the units through the inlet ports 60, reference being had to Fig. 2, and into the receiving chamber 58 to pass through the hollow piston 53 into the cylinder 43. The inflowing pressurized fluid will then cause the outward movement of the piston 53 of each hydraulic elevating unit until the lateral bores 78 of the fluid return tube 76, which is moving or sliding upwardly with the piston 53, reach the upper end of the plunger rod 79 which, as previously stated and as is shown in Fig. 2, is attached at its lower end to the bottom of the cylinder. As soon as the safety bores 78 are uncovered by the upper end of the rod 79 the fluid will start to bleed off pass into the fluid return tube and flow through the bore or passage 96 of the valve stem 91, to and through the fluid outlet ports 97 of this valve stem and into the outlet chamber 65, passing therefrom through the nipple passage 67 to the fluid return conduits 145 and 146 which lead back to the reservoir 119'. Accordingly, it will be seen that all of the hydraulic elevating units will have the pistons 53 forced outwardly to the same extent and the vehicle body will accordingly be elevated and maintained in a transversely horizontal positon so long as the automotive vehicle remains on a level surface or so long as no unbalancing load is applied to the vehicle body. It will also be apparent that the fluid will flow continuously in a closed circuit through the conduits and the hydraulic elevating units while the vehicle body remains transversely horizontal and the motor vehicle engine is running, the rate of flow being controlled by the area of the ports 78 uncovered by the rod 79.

The amount of the fluid supplied to the dual pump may be controlled by means of the needle valve 130 carried by the fluid reservoir, as illustrated in Fig. 18.

During this time that the four units are all equally elevated and the contacts of the distributor unit are open as shown in Fig. 13, the valve stem 91 of each unit will be in a closed position with the ports 98 and 99 out of registry one with the other as illustrated in Fig. 5, and the armatures 103 of the valve actuating motors will be swung away from the solenoid cores 110 as illustrated in Fig. 3. If the vehicle is now run along a level surface the transversely level condition of the vehicle body will be maintained by the elevated pistons of the hydraulic elevating units. However, if the transversely level status of the vehicle body is changed as by the movement of the vehicle around a curve which would tend to elevate the side of the body on the inside of the curve, due to centrifugal force, relative movement will be obtained between the housing of the electric current distributor unit and the pendulum mounted therein upon the shaft 177 to effect the closing of contacts on the side nearest to the outside of the curve, which will result in the energization of the valve operating motor units 90 associated with the elevating units on the side of the vehicle nearest to the inside of the curve. The energization of the valve operating motors in the units on the inner side of the vehicle, that is the side of the vehicle nearest the inner side of the curve, will effect the rotation of the valve stems 91 therein to open the valves by bringing the ports 98 and 99 into registry. This will permit release of pressurized fluid from the chamber 58 through the escape ports 97 thereby permitting the downward movement of the piston 53 in each of the two units to effect the lowering of the side of the vehicle nearest the inside of the curve to restore the transversely level condition of the body. In this described action when the ports 97 are opened, the number thereof will provide an escape area for the fluid larger than the area provided by the uncovering of the ports 78 or the bleed opening thus provided by the control ports 78. Under the downward force applied by gravity to the pistons 53, due to the weight of the vehicle body thereon, the piston will start to move down when these ports 97 are opened and the bleed off through the control ports will be shut off. The gravitational effect of the vehicle body weight on the pistons will force the fluid through the escape ports at a faster rate than it had previously been passing through the bleed ports and at a faster rate than it is supplied by the pump and the desired lowering or inward movement of the pistons will occur. As previously set forth, the rate of flow or amount of fluid supplied to the pump from the reservoir is controllable by the needle valve at the reservoir.

If, for any reason, it should be desirable to effect the lowering of one side of the vehicle body while the vehicle is standing on a level surface, this can be done by the hand operation or swinging of the pendulum and the contacts carrying arms or blades 217 by turning the knob 180 which is supported on and positioned in front of the instrument panel 147 (Fig. 11). This will swing the distributor unit housing by the rotation of the shaft section 177 relative to the suspended pendulum and bring the desired contact point 204 into electrical connection with the adjacent contact point 218.

I claim:

1. Means for effecting changes in steering wheel camber in accordance with steering condition requirements in an automotive vehicle having running gear with front wheels and steering mechanism including steering knuckle pins and having independent coil suspension springs between the running gear and body; said means comprising a spring supporting seat mounted upon the top of each steering knuckle pin, spring supporting means upon the rear of the running gear, a hydraulic fluid elevating unit mounted upon each spring between the latter and the vehicle body and including a cylinder directly supported by the spring and a piston directly connected with the body, a source of fluid under pressure, an open conduit for supplying pressurized fluid constantly from said source directly to each unit cylinder to effect a predetermined elevation by the piston of the adjacent portion of the body whereby the body is elevated relative to the supporting springs and running gear and maintained in a transversely horizontal condition, a fluid return conduit between each unit and said source, means between the cylinder and its associated conduit for releasing pressurized fluid from the cylinders of the units when said predetermined elevation is reached, other and normally closed means between each cylinder and its associated conduit for releasing when opened an increased volume of pressurized fluid from each of the units, and gravity and inertia controlled means for opening said normally closed means in two units on one side of the vehicle body, upon movement of the vehicle body to an inclined position from a transversely horizontal position to reduce the force of the pressurized fluid in said two units to permit lowering by gravity of the high side of the vehicle body.

2. The invention according to claim 1, wherein said gravity and inertia controlled means includes an electrical unit operatively coupled with each of said normally closed means and when energized functioning to open the same, an electric control circuit for two of said electrical units on one side of the vehicle, an electric control circuit for two of said units on the other side of said vehicle, and a control switch in each of said circuits.

3. The invention according to claim 1, wherein the piston slidable in the cylinder is hollow and in communication with the cylinder and has an upper end connected with an overlying part of the vehicle body, the means for releasing pressurized fluid comprising an outlet port leading from the hollow piston to the return conduit and means attached to and stationary with the cylinder for opening said port upon outward movement of the piston to said predetermined elevation, and said normally closed means when open establishing a fluid exhaust passage between the cylinder, the hollow piston, and said outlet conduit.

4. A system of the character disclosed for an automotive vehicle wherein there is running gear including front and rear wheels, the front wheels having steering mechanism connected therewith and including steering knuckle pins, a body and independent coil suspension springs between the body and running gear; comprising means supporting the front springs upon said knuckle pins, means for supporting the rear springs upon the rear wheels, a hydraulic elevating unit supported by each spring and each unit comprising an elongate cylinder suspended in its spring and an elongate piston slidably positioned in the cylinder and connected with the vehicle body, a fluid inlet leading into the cylinder through the piston, a fluid outlet for the cylinder passing in part through the piston, a permanently open fluid supply conduit common to the inlets of the units on one side of the vehicle, a permanently open fluid supply conduit common to the inlets of the units on the other side of the vehicle, a source of fluid supply, means for moving fluid under pressure to the two supply conduits from said source of supply, fluid return conduits leading from the fluid outlets of the units to said supply, valve means for each unit having parts connected to the piston and cylinder and opened by and upon the outward movement of the piston to a predetermined extent to establish a bleed passage between the inlet and outlet of the unit cylinder, other valve means associated with said outlet and having a part movable for establishing when open additional fluid exhaust between the cylinder and the outlet therefor, and gravity and inertia controlled means carried by the vehicle body and actuated by gravity and inertia upon the movement of the vehicle body from a transversely level state to an inclined state to effect the simultaneous opening of the said other valve means of the two units on the high side of the vehicle body whereby to cause the lowering by gravity of the pistons thereof and the side of the body supported thereby.

5. The invention according to claim 4, wherein said gravity and inertia controlled means includes an electric unit having a rotatable armature operatively coupled with said other valve means for moving the said part thereof to open position when said electric unit is energized.

6. The invention according to claim 4, wherein said piston is hollow and opens at its inner end into the cylinder, one of said parts of the first valve means comprising a tube attached at one end to the outer end of the piston and connected to said outlet, the tube extending axially of and lying within the piston and the other part comprising, a plunger rod attached at one end to the cylinder and extending into the tube for sliding movement therein, said tube having wall ports leading thereinto from the interior of the piston which are uncovered by the plunger rod upon said outward movement of the piston to the said extent, and said other valve means when the said movable part thereof is open exhausting fluid from the hollow piston and cylinder into said tube to pass therefrom to the outlet.

7. The invention according to claim 6, wherein the said movable part of said other valve means comprises a valve stem rotatably supported in the top of the piston and extending axially thereinto and into the said one end of said tube, the inner end of the stem extending into the tube having an axial bore opening through said inner end into the tube and having communication with said outlet, said tube and the inner end portion of the stem having exhaust ports adapted to register upon a predetermined rotation of the stem in the tube to establish communication between the interior of the piston and the outlet, and said gravity and inertia controlled means including an electric unit operatively coupled with said valve stem and functioning when energized to turn the latter.

8. A hydraulic elevating unit comprising an elongate cylinder having a top end adapted to receive a piston, an elongate piston extending thereinto through said top end, a pair of hollow bodies on the top end of the piston and forming fluid supply and exhaust chambers, means for conducting fluid from the supply chamber into the cylinder, said means additionally forming an outlet passage from the cylinder through the piston to said exhaust chamber, valve means shutting off fluid flow through said passage when the piston is at its inner position in the cylinder and establishing such flow when the piston is moved to a predetermined outward position, and other valve means for establishing exhaust flow of fluid into said outlet passage to the exhaust chamber.

9. A hydraulic elevating unit according to claim 8, wherein the said piston is hollow and the said means for conducting fluid from the supply chamber into the cylinder includes a passageway through the inner end of the piston, said outlet passage forming means comprising a tube attached at one end to the outer end of the piston to move therewith and extending axially therein, and the first valve means includes a fluid port opening through the wall of and into the tube from within the piston and a rod attached at one end to the inner end of the cylinder and extending into the tube and closing said port when the piston is at said inner position.

10. The invention according to claim 9, wherein the said other valve means comprises a valve stem rotatably carried by the piston at the outer end of the latter and extending axially thereof through the exhaust chamber into the outer end of the tube, the stem having an axial bore in its inner end portion opening at one end into the tube and communicating at its other end with the exhaust chamber, the bore of the stem having ports registrable with ports through the wall of the tube for admitting fluid from the hollow piston into the bore, and means for turning said valve stem to effect registration of the latter ports.

11. A hydraulic elevating unit comprising an elongate cylinder having a top end adapted to receive a piston, an elongate hollow piston slidably disposed in said cylinder and opening at its inner end into the cylinder, a head carried upon the outer end of the piston and formed to provide a fluid supply chamber and a fluid exhaust chamber, the fluid supply chamber opening directly into the hollow piston, a tube secured at one end to the head and extending axially into the piston and opening thereinto at its inner end, said tube having a port through its wall adjacent to said inner end, a rod disposed axially in said tube and attached at one end to the inner end of the cylinder, said tube being slidable on the rod and having the wall opening closed thereby until the piston has moved to a predetermined position outwardly of the cylinder, a tubular valve stem rotatably supported by said head and passing through said exhaust chamber into said one end of the tube and opening thereinto, said stem having a wall port opening into the exhaust chamber, said tube and tubular stem having registrable ports for establishing fluid exhaust flow from the hollow piston to the exhaust chamber, and means for effecting turning of said stem.

12. The invention according to claim 11, wherein said means comprises an electric unit mounted on said head and including a rotatable member coupled with said valve stem to effect turning of the stem upon energization of the unit.

13. The invention according to claim 11, with a closed housing carried by said head, said stem having a portion extending into said housing, said means comprising an electric unit enclosed in the housing and embodying fixed magnet coils and an armature attached to said stem extension and adapted to turn the valve stem to valve open position under the attraction of the energized coils, and spring means for turning the armature and valve stem to valve closed position when the coils are deenergized.

14. In an automotive vehicle, a chassis frame including side beams, steerable front wheels, spring suspension means between said front wheels and the chassis frame, rear wheel running gear including an axle housing transversely of the rear of the chassis frame, rear suspension springs, means carried by said axle housing for supporting each rear spring, means coupling the chassis frame with each rear spring for supporting the rear of the frame on the springs, and a flexible transverse stabilizing coupling between a side beam of the chassis frame on one side and the axle housing carried spring supporting means on the other side of the frame, said flexible coupling comprising an arm secured to and depending from said one side beam of the frame, an arm carried by the axle housing carried spring supporting plate at the other side of the frame and extending upwardly and located on the outer side of the adjacent spring, and a tie rod disposed between and pivotally attached at its ends to the said arms, the tie rod spanning a space across the chassis greater than the distance between the centers of the springs.

15. Means for effecting changes in steering wheel camber in accordance with steering condition requirements in an automotive vehicle having wheeled running gear, a body and independent suspension springs between the running gear and body; said means comprising duplicate hydraulic fluid elevating units each interposed between a spring and the body, a source of fluid pressure, a constantly open conduit between the said source and each unit supplying pressurized fluid continuously to each unit to actuate each of the units and thereby maintain a predetermined elevated condition of the adjacent portion of the body, the body being maintained elevated by the fluid under pressure relative to the suspension springs and running gear in a transversely horizontal condition, a fluid return conduit between each unit and said source, and a gravity and inertia controlled means for releasing a volume of the pressurized fluid from the elevating units on one side of the vehicle body into the associated return conduit sufficient to cause the lowering of said one side by gravity following elevation of the said one side by centrifugal force incident to the movement of the vehicle along a curved path.

16. The invention according to claim 15, wherein each of said units includes an upright cylinder having a piston therein for upward movement, means between the cylinder and the return conduit for effecting outflow of the pressurized fluid from the cylinder when the piston has risen to a predetermined extent, and said gravity-inertia controlled means including other means between the cylinder and the return conduit for permitting increased outflow of the fluid from the cylinder to reduce the lifting force applied to the piston by the fluid.

17. The invention according to claim 15, wherein each of said units includes a cylinder having a piston movable therein, a safety fluid bleed-off means between the cylinder and its associated return conduit limiting the outward movement of the piston, means for opening said bleed-off means upon a predetermined outward movement of the piston, and said gravity and inertia controlled means includes valve means between the cylinder and the return conduit functioning when opened to reduce the pressure of the fluid against the piston.

18. Means for effecting changes in steering wheel camber in accordance with steering condition requirements in an automotive vehicle, in combination with a vehicle body, running gear, independent suspension springs between the running gear and the body; said means comprising a hydraulic elevating unit supported on each spring and interposed between the spring and the vehicle body, each unit comprising a cylinder and a piston therein, an open conduit means circulating a fluid under constant pressure from a supply source into the cylinders of said units to extend the pistons and elevate the body equally on both sides to a transversely level condition, means for maintaining the pistons of said units extended by the fluid pressure to maintain the said body elevated position and for maintaining continuance of the fluid circulation from the cylinders back to said supply source while the pistons are so extended, valve means in each unit permitting when opened increased fluid flow from the cylinder thereof back to the source and effecting the lowering by gravity of one side of the vehicle body following further elevation of such side by centrifugal force incident to the movement of said vehicle along a curved path, electric motor means connected with each valve which when energized effects the opening of the valve, and means for effecting the simultaneous energization of the said electric means for two of the valve means on either side of the vehicle body.

19. The invention according to claim 18, wherein the last stated means comprises a gravity and inertia actuated circuit closer.

References Cited in the file of this patent

UNITED STATES PATENTS

| | | |
|---|---|---|
| 1,331,650 | Kruse | Feb. 24, 1920 |
| 2,214,948 | Youngren | Sept. 17, 1940 |
| 2,596,427 | Nordmark et al. | May 13, 1952 |
| 2,623,758 | Cruz | Dec. 30, 1952 |
| 2,650,107 | Monnig | Aug. 25, 1953 |
| 2,650,108 | Bruce | Aug. 25, 1953 |
| 2,684,254 | Goss | July 20, 1954 |